US008694358B2

(12) United States Patent
Tryfon

(10) Patent No.: US 8,694,358 B2
(45) Date of Patent: Apr. 8, 2014

(54) SYSTEMS, METHODS, AND MEDIA FOR SURVEY MANAGEMENT

(75) Inventor: Jason Tryfon, Milton (CA)

(73) Assignee: Vital Insights Inc., Mississauga (CA)

(*) Notice: Subject to any disclaimer, the term of this patent is extended or adjusted under 35 U.S.C. 154(b) by 538 days.

(21) Appl. No.: 12/423,761

(22) Filed: Apr. 14, 2009

(65) Prior Publication Data

US 2010/0262462 A1 Oct. 14, 2010

(51) Int. Cl.
*G06Q 10/00* (2012.01)
*G06Q 30/00* (2012.01)
*G06Q 30/02* (2012.01)
G06F 3/048 (2013.01)
G06F 17/30 (2006.01)

(52) U.S. Cl.
CPC ............ *G06Q 30/0203* (2013.01); *G06Q 30/02* (2013.01)
USPC .................... 705/7.32; 707/E17.108; 715/810

(58) Field of Classification Search
CPC ........................... G06Q 30/0203; G06Q 30/02
USPC ......................................................... 705/7.32
See application file for complete search history.

(56) References Cited

U.S. PATENT DOCUMENTS

| | | | |
|---|---|---|---|
| 6,233,564 B1 | 5/2001 | Schulze | |
| 6,380,928 B1 | 4/2002 | Todd | |
| 6,912,521 B2 | 6/2005 | Kraft et al. | |
| 6,999,987 B1 * | 2/2006 | Billingsley et al. | 709/203 |
| 7,162,471 B1 * | 1/2007 | Knight et al. | 707/750 |
| 7,487,435 B2 | 2/2009 | Aviv | |
| 7,778,862 B2 | 8/2010 | Vaccarelli et al. | |
| 2001/0037206 A1 * | 11/2001 | Falk et al. | 705/1 |
| 2001/0047270 A1 | 11/2001 | Gusick | |
| 2002/0052774 A1 | 5/2002 | Parker et al. | |
| 2002/0053076 A1 * | 5/2002 | Landesmann | 725/10 |
| 2002/0138338 A1 | 9/2002 | Trauth et al. | |
| 2003/0069822 A1 | 4/2003 | Ito et al. | |
| 2004/0068544 A1 | 4/2004 | Malik et al. | |
| 2004/0210472 A1 | 10/2004 | Lew | |
| 2004/0215502 A1 | 10/2004 | Takahashi et al. | |
| 2004/0230438 A1 * | 11/2004 | Pasquale et al. | 705/1 |

(Continued)

FOREIGN PATENT DOCUMENTS

| | | |
|---|---|---|
| CA | 2504984 | 5/2004 |
| WO | WO2008144639 | 11/2008 |

OTHER PUBLICATIONS

Lee, T.Y.; Li, S.; Ran Wei, "Needs-Centric Searching and Ranking Based on Customer Reviews," E-Commerce Technology and the Fifth IEEE Conference on Enterprise Computing, E-Commerce and E-Services, 2008 10th IEEE Conference on , vol., No., pp. 128,135, Jul. 21-24, 2008.*

(Continued)

*Primary Examiner* — Scott Zare
(74) *Attorney, Agent, or Firm* — Carr & Ferrell LLP

(57) ABSTRACT

A computer-implemented method for survey management is disclosed. Purchase data is received via a computer network from a first digital device coupled to the computer network. A targeted survey is generated based on the purchase data. A web link associated with the targeted survey is transmitted to a second digital device coupled to the computer network. A survey response is received via the web link from the second digital device. A weight is assigned to the survey response. The weighted survey response is transmitted for display on a third device coupled to the network.

26 Claims, 16 Drawing Sheets

(56) References Cited

U.S. PATENT DOCUMENTS

| | | | |
|---|---|---|---|
| 2004/0230989 A1* | 11/2004 | Macey et al. | 725/24 |
| 2005/0043985 A1* | 2/2005 | Gillespie | 705/10 |
| 2005/0075919 A1 | 4/2005 | Kim | |
| 2005/0149382 A1* | 7/2005 | Fenner et al. | 705/10 |
| 2005/0216363 A1 | 9/2005 | Vaccarelli et al. | |
| 2006/0015519 A1 | 1/2006 | LaBrosse | |
| 2006/0121434 A1 | 6/2006 | Azar | |
| 2006/0143025 A1 | 6/2006 | Jeffery et al. | |
| 2007/0011185 A1 | 1/2007 | John | |
| 2007/0083472 A1* | 4/2007 | Israel | 705/55 |
| 2007/0260475 A1 | 11/2007 | Bhanote | |
| 2007/0271111 A1 | 11/2007 | Dubinsky | |
| 2008/0097769 A1 | 4/2008 | Galvin et al. | |
| 2008/0140683 A1 | 6/2008 | Hanif et al. | |
| 2008/0154783 A1 | 6/2008 | Rule et al. | |
| 2009/0187460 A1 | 7/2009 | Pavagadhi et al. | |
| 2009/0307083 A1* | 12/2009 | Nyhan et al. | 705/14.44 |
| 2010/0023377 A1 | 1/2010 | Sheridan | |
| 2010/0023380 A1 | 1/2010 | Anderson | |
| 2010/0030615 A1 | 2/2010 | Doyle et al. | |
| 2010/0038416 A1* | 2/2010 | Canora | 235/375 |
| 2010/0076816 A1 | 3/2010 | Phillips | |
| 2010/0174974 A1 | 7/2010 | Brisebois | |
| 2010/0228829 A1 | 9/2010 | Niv | |
| 2010/0246797 A1 | 9/2010 | Chavez et al. | |
| 2010/0262463 A1 | 10/2010 | Tryfon | |
| 2010/0324971 A1* | 12/2010 | Morsberger | 705/10 |
| 2011/0113007 A1 | 5/2011 | Buckley | |
| 2011/0166930 A1 | 7/2011 | DeCotiis et al. | |
| 2012/0016719 A1 | 1/2012 | Meyer et al. | |
| 2012/0022905 A1 | 1/2012 | Meyer et al. | |
| 2012/0095796 A1 | 4/2012 | Gately et al. | |

OTHER PUBLICATIONS

Non-Patent Literature document from www.ebay.com, "All About Feedback", pp. 1-4, date at least as far back as Dec. 20, 2008 (retrieved from www.archive.org) (hereinafter "eBay").

define: deduct; see World English Dictionary, 1998.

define: "application" as "a computer program with an interface, enabling people to use the computer as a tool to accomplish a specific task. Word processing, spreadsheet, and communications software are all examples of applications." See The American Heritage Science Dictionary, 2002.

International Search Report mailed Jul. 12, 2010 in Patent Cooperation Treaty Application No. PCT/CA2010/000523, filed Apr. 13, 2010.

International Search Report mailed Aug. 2, 2010 in Patent Cooperation Treaty Application No. PCT/CA2010/000524, filed Apr. 13, 2010.

* cited by examiner

FIG. 13

Customer Satisfaction

1. Were you satisfied with the date and time your delivery was scheduled?
2. Were you satisfied with the negotiation process?
3. Were you satisfied with the location of your vehicle presentation?
4. Were you satisfied with the amount of time spent during the delivery process answering your questions and reviewing the vehicle?
5. Did you feel comfortable with the physical location in the dealership where the price of your vehicle was negotiated?
6. When scheduling your delivery did the Sales Advisor ask if there were any features you would specifically like to have explained and/or demonstrated?
7. Were you satisfied with the amount of time it took to be greeted by someone at the center when you arrived for delivery of your vehicle?
8. Do you feel that your delivery experience was more of a special event rather than a transaction?
9. If you met with a Finance Representative, were you satisfied with the amount of time spent?
10. After agreeing to lease / purchase your vehicle, if you needed to speak with someone else to arrange the appropriate financing was the process for completing the paperwork satisfactory?

FIG. 14

SYSTEMS, METHODS, AND MEDIA FOR SURVEY MANAGEMENT

The present application is related to U.S. patent application Ser. No. 12/423,767 titled "Systems, Methods, and Media for Management of a Survey Response Associated with a Score," filed concurrently herewith on Apr. 14, 2009.

FIELD OF INVENTION

The present application relates generally to survey management, and more particularly, computerized methods for generating, managing and displaying survey data.

BRIEF SUMMARY OF THE INVENTION

Embodiments of the present invention provide systems, methods, and media for managing survey data. In a non-exhaustive list, survey data may include a survey question, a survey response, a score based on the survey response, a name, a keyword, purchase data, invoice data and any combination thereof. Purchase data may include data obtained by a seller of a product and/or a service during a transaction with a customer involving a product and/or a service. In a non-exhaustive list, purchase data may include a customer identifier, a name, a telephone number, an e-mail address, a street address, a make and/or model of a conveyance, a vehicle identification number (VIN), and/or a serial number associated with the transaction. The systems, methods, and media described herein may make use of computerized surveys that are targeted to a customer based on purchase data. Computerized surveys with survey questions may be made accessible to a digital device associated with a customer via the Web or other online network, and a survey response from the customer may be made available to a digital device associated with a seller.

In a first aspect, a computer-implemented method for survey management is disclosed. Purchase data is received via a computer network from a first digital device coupled to the computer network. A targeted survey is generated based on the purchase data. A web link associated with the targeted survey is transmitted to a second digital device coupled to the computer network. A survey response is received via the web link from the second digital device. A weight is assigned to the survey response. The weighted survey response is transmitted for display on a third device coupled to the network.

In a second aspect, a computer-readable storage medium having embodied thereon a program, the program being executable by a computer to perform a method for survey management, is disclosed. Survey data is received via a network from a first device coupled to the network. A keyword is identified in the survey data. A keyword identifier corresponding to the identified keyword is assigned to the response.

In a third aspect, a computer-implemented method for generating a survey is disclosed. Purchase data is received via a network from a device coupled to the network. The purchase data is processed to locate a purchase identifier. A first set of questions is generated based on the identified purchase. A selection of a second set of questions is received via the network from the device. A survey is generated based on the first set and second set of survey questions.

In a fourth aspect, a graphical user interface for viewing a survey is disclosed. The graphical user interface includes a survey question display configured to display a survey question of a survey generated by a survey generator. The graphical user interface includes a survey response display configured to display a survey response provided by a user input received from a digital device. The graphical user interface includes a survey response weight display configured to display quantitative data relating to the survey response. The graphical user interface includes a survey tracking display that is configured to display a status of the generated survey. In some embodiments, the graphical user interface includes a mandatory questions display configured to display a mandatory question configured for a generated survey. The mandatory question is selected from a survey database based on purchase data. In some embodiments, the graphical user interface includes a rotating questions display configured to display a plurality of rotating questions and receive a user input to select at least one rotating question from the plurality of rotating questions, the selected question configured for inclusion in the generated survey.

The methods described herein may be performed via a set of instructions stored on storage media (e.g., computer readable media). The instructions may be retrieved and executed by a processor. Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

BRIEF DESCRIPTION OF THE DRAWINGS

FIG. 13 illustrates an exemplary view of the GUI of FIG. 12.

FIG. 14 illustrates an exemplary view of the GUI of FIG. 12.

DETAILED DESCRIPTION

Embodiments of the present invention provide systems, methods, and media for managing survey data. In a non-exhaustive list, survey data may include a survey question, a survey response, a score based on the survey response, a name, a keyword, number of response days, purchase data, and/or invoice data. Purchase data may include data obtained by a seller of a product and/or a service during a transaction with a customer involving a product and/or a service. In a non-exhaustive list, purchase data may include a customer identifier, a name, a telephone number, an e-mail address, a street address, a make and/or model of a conveyance, a vehicle identification number (VIN), and/or a serial number associated with the transaction.

The systems, methods, and media described herein may make use of computerized surveys that are targeted to a customer based on purchase data. The targeted surveys may include survey questions, the answers to which may provide the seller with the customer service experience provided by the seller's employees, the reason for the customer's visit to the seller, and the like. An exemplary seller who may make use of targeted surveys may be a manufacturer or a dealership of new or pre-owned conveyances or motor vehicles, such as automobiles, motorcycles, resort vehicles, and the like, as well as services associated with the maintenance of such conveyances. In some embodiments, the targeted survey may be made available online via the Web or another network to a customer's digital device, such as a desktop computer or a mobile device. The customer may provide a survey response to the targeted survey. The survey response may include a return of the survey with no survey questions answered, a return of the survey with a portion of the survey questions answered, and a return of the survey with all survey questions answered. In some embodiments, the survey response may include any comments provided by the customer. The customer may provide the survey response to the seller via the Web or another online network. Though the following discussion exemplifies the use of survey management methods, systems and media disclosed herein in the automotive industry with respect to discussions involving conveyance dealerships and manufacturers, further applications will become apparent to one skilled in the art upon review of this disclosure.

Figure 1:
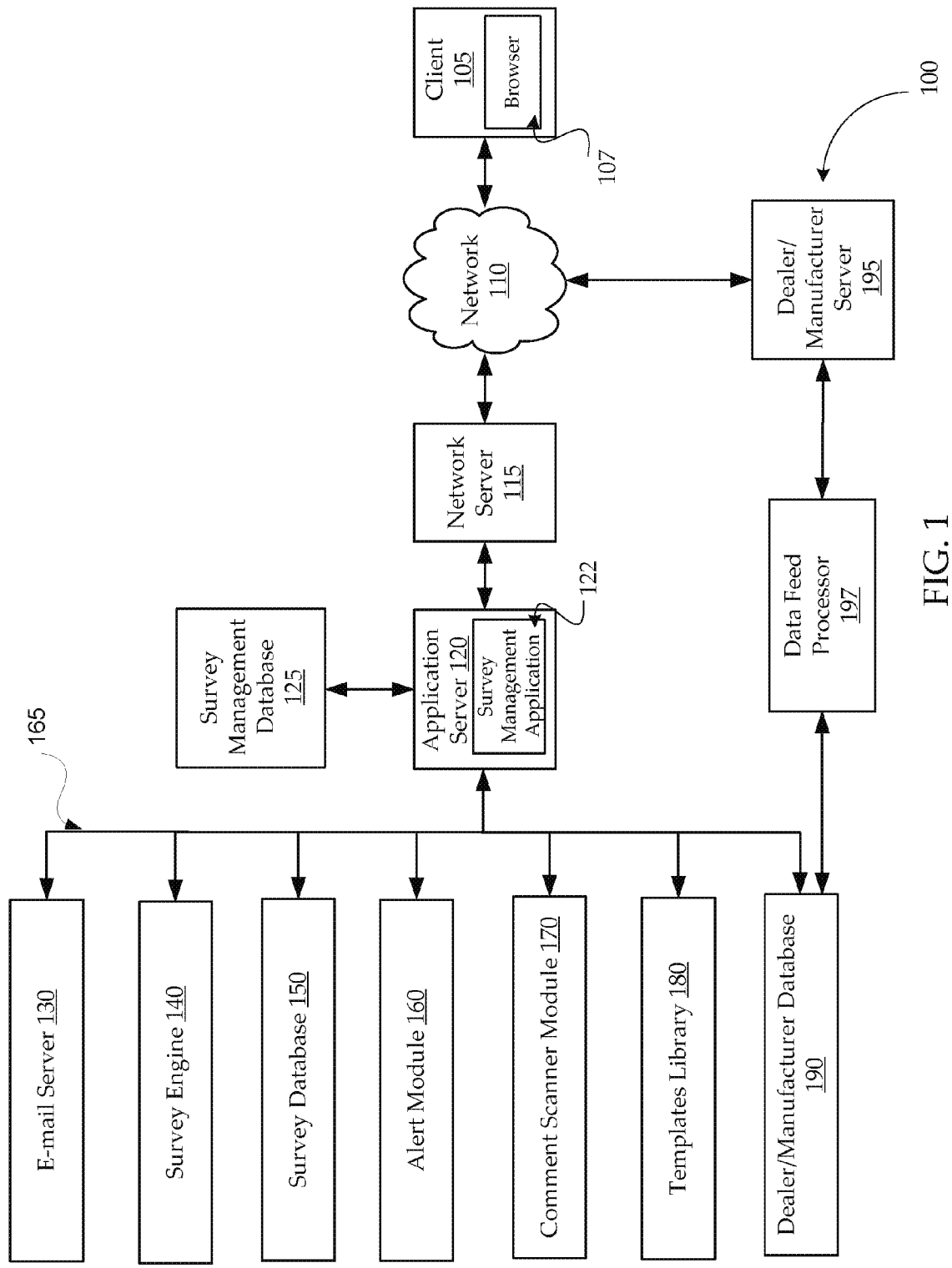
FIG. 1 is an exemplary networking environment in accordance with embodiments of the present invention.

FIG. 1 is an exemplary networking environment 100 in accordance with embodiments of the present invention. The networking environment includes client 105 having browser 107, Network 110, Network Server 115, Application Server 120 hosting Survey Management Application 122, Survey Management Database 125, E-mail Server 130, Survey Engine 140, Survey Database 150, Alert Module 160, Comment Scanner Module 170, Templates Library 180, Dealer/Manufacturer Database 190, Dealer/Manufacturer Server 195, and Data Feed Processor 197. Network 110 may be any type of network, including but not limited to the Internet, LAN, WAN, a telephone network, and any other communication network that allows access to data, as well as any combination of these. Client 105 may be any digital device, including, but not limited to a desktop computer, laptop computer, mobile telephone device, and PDA. In some embodiments, Network 110 is coupled to Client 105, Network Server 115, Application Server 120, E-mail Server 130 and Dealer/Manufacturer Server 195. One skilled in the art can appreciate that the networking environment 100 as shown in FIG. 1 is exemplary only and that it is not limited to what is shown. For all figures mentioned herein, like numbered elements refer to like elements throughout.

Application Server 120 and Dealer/Manufacturer Server 195 are coupled to Survey Management Database 125 and Dealer/Manufacturer Database 190, respectively. It will be apparent to one skilled in the art that the embodiments of this invention are not limited to any particular type of server and/or database. In some embodiments, the servers mentioned herein are configured to control and route information via the Network 110 or any other networks (not shown in FIG. 1). The servers herein may access, retrieve, store and otherwise process data stored on any of the databases mentioned herein. The databases mentioned herein are configured to store survey data, which includes, but is not limited to survey question, a survey response, a score based on the survey response, a name, a keyword, purchase data, and/or invoice data, as discussed above. The databases may also store historical action logs associated with server activity. For example, Survey Management Database 125 may generate a historical action event when a targeted survey is sent to Client 105, as is described more fully herein. Further, the databases mentioned herein may store information about messages, such as e-mail messages associated with a customer, in particular about whether such e-mail messages were sent, date and time information about when the e-mail messages were sent (e.g. time stamp information), contents of the e-mail message, and the target survey.

Any number of any of elements 105-197 may be present in networking environment 100, and networking environment 100 is configured to serve these elements. For example, Network Server 115 may provide a generated survey via Network 110 to a plurality of clients 105 having browsers 107, despite only one client pictured in FIG. 1. In addition, Clients 105, Application Server 120, and Dealer/Manufacturer Server 195 may be associated with any number of digital devices configured for viewing, analyzing, and reporting survey data and/or purchase data (not shown in FIG. 1). E-mail server 130, Survey Engine 140, Survey Database 150, Alert Module 160, Comment Scanner Module 170, Templates Library 180, Dealer/Manufacturer Database 190, and Dealer/Manufacturer Server 195 may be in communication with each other over one or more networks, including Network 110 (not illustrated in FIG. 1 for simplicity). Alternatively, E-mail server 130, Survey Engine 140, Survey Database 150, Alert Module 160, Comment Scanner Module 170, Templates Library 180, Dealer/Manufacturer Database 190, and Dealer/Manufacturer Server 195 may be implemented on a single machine and communicate with each other via one or more communication buses, such as bus 165.

In some embodiments, invoice data and/or purchase data may be made available to Dealer/Manufacturer Server 195. Dealer/Manufacturer Server 195 may reside at a conveyance dealership location and transmitted via a network, such as Network 110. The invoice data and/or purchase data may be streamed in real time to Dealer/Manufacturer Database 190 and stored therein. In some embodiments, purchase data may be extracted from invoice data via Data Feed Processor 197. Invoice data and/or purchase data may be associated with a timestamp based on, for example, a time at which the invoice data and/or purchase data was stored in the Dealer/Manufacturer Database 190 (timestamp module not shown in FIG. 1). Survey Engine 140 may retrieve purchase data from Dealer/Manufacturer Database 190. The Survey Engine 140 may execute a software module that may scan or locate a timestamp and determine whether a targeted survey has been generated.

If a targeted survey has been generated, Survey Engine 140 may locate the generated survey. Alternatively, Survey Engine 140 may locate an e-mail message previously sent to Client 105 having a link to the targeted survey. The targeted survey and/or e-mail message may be stored in a database (e.g., Survey Management Database 125 or Survey Database 150). Survey engine 140 may provide the targeted survey and/or e-mail message to E-mail Server 130 for transmission to Client 105; that is, E-mail Server 130 may "resend" the targeted survey.

Still referring to FIG. 1, if a targeted survey has not been generated, Survey Engine 140 may determine a purchase from the purchase data. Survey Engine 140 may retrieve survey questions stored in Survey Database 150 and a survey template from Templates Library 180 in order to generate the targeted survey. Survey Engine 140 may also generate a web link or URL to direct a customer to the targeted survey. The web link or URL may be provided to the customer via an e-mail message transmitted over Network 110 to Client 105. The customer may access the web link or URL in order to transmit a survey response via a user input to Client 105. Browser 107 may render a graphical user interface of the targeted survey for viewing on Client 105, to which a customer may then provide a survey response via user input to Client 105. The survey response may include, for example, a text string, a negative response, a positive response, a character, a numeral, and any combination of these.

Application Server 120 manages survey responses received via Network 110 from Client 105 via Survey Management Application 122 hosted on Application Server 120. Application Server 120 may receive survey responses from Client 105 and retrieve other survey data from any of elements 125-197 as shown in the context of FIG. 1. Application Server 120 may provide the survey responses to Survey Management Application 122 in order to process, provide for display, and/or otherwise manage the survey data. Application Server 120 may store survey data received from Client 105 on Survey Management Database 125. Survey Management Application 122 may perform various metrics on the survey, such as assigning a weight to a survey question or a survey response. Survey Management Application 122 may generate an alert to Dealer/Manufacturer 195 or a Client 105 via Alert Module 160 based on predefined criteria. Survey Management Application 122 may also locate a keyword in the survey data via Comment Scanner Module 170 and generate a log event in Survey Management Database 125.

Figure 2:
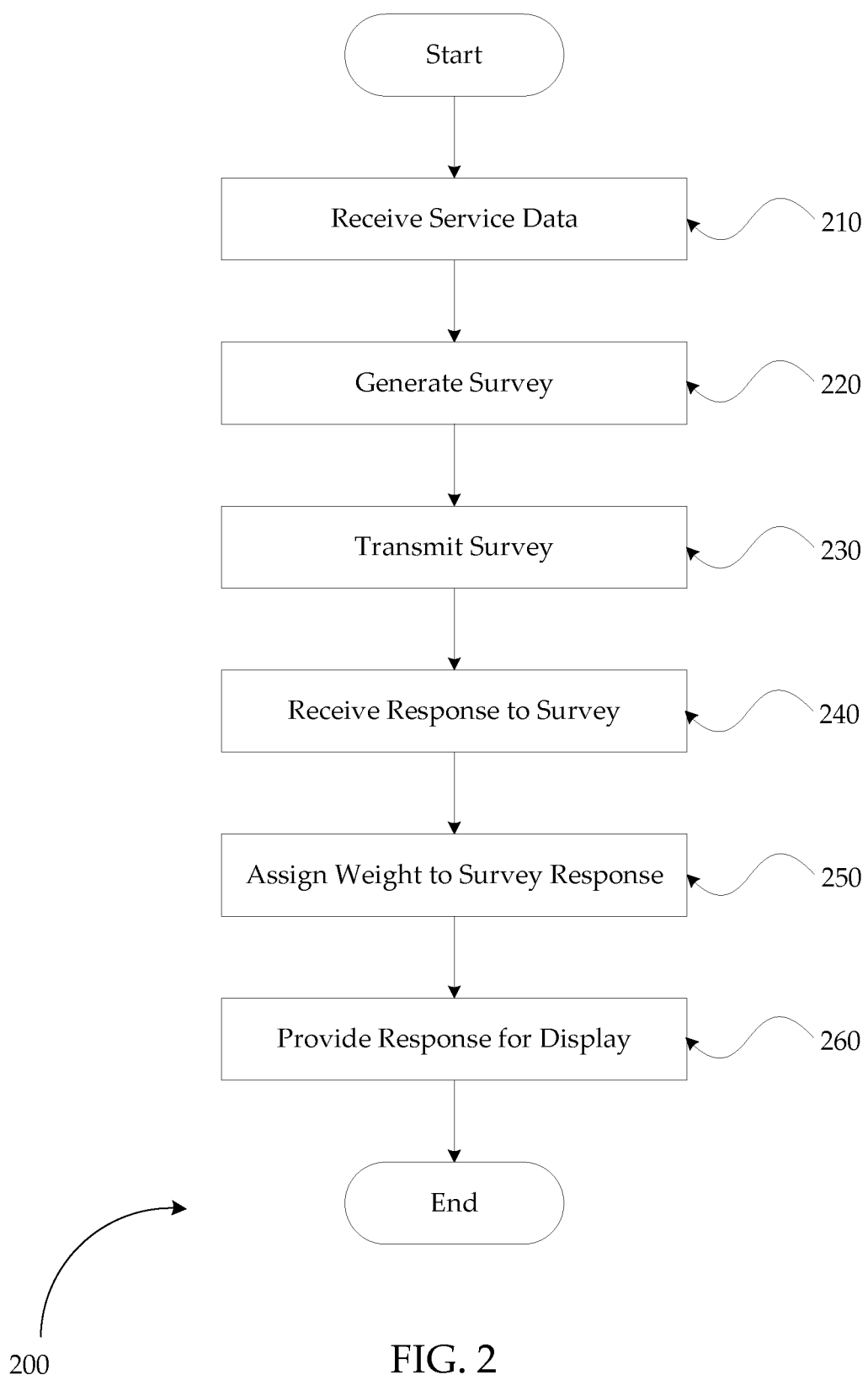
FIG. 2 is a flowchart of an exemplary computer-implemented method for survey management.

FIG. 2 illustrates an exemplary computer-implemented method 200 for survey management. In step 210, data is received from a digital device. Data, such as purchase data and/or invoice data, may be received by the Dealer/Manufacturer Database 190 as shown in FIG. 1. In some embodiments, purchase data may be obtained in real time from Dealer/Manufacturer Server 195, which may be resident at a dealership. Purchase data based on a set of predefined criteria. For example, purchase data may be extracted from a data management system associated with Dealer/Manufacturer Server 195 and parsed to locate purchase data. A data feed may be transmitted to Dealer/Manufacturer Database 190 via predefined XML file formats, FTP, and the like.

Alternatively, a web services document may be provided to the Dealer/Manufacturer Server 195 that specifies one or more parameters of purchase data that may be used to generate a target survey. For example, a web form configured to capture a plurality of data fields may be used. Alternatively, invoice data associated with purchases of products and services may be streamed in real time from Dealer/Manufacturer Server 195 over Network 110 (as shown in FIG. 1) and saved in real time. Invoice data may include any sort of documentation related to the purchase of a good or service provided by a dealership. Exemplary invoice data may include a repair order, a bill of sale for automobile parts, etc. Invoice data saved in Dealer/Manufacturer Database 190 may be parsed either in real time, or at some future time via Data Feed Processor 197 or the like.

Purchase data located in invoice data may be flagged or otherwise marked by a purchase identifier. A purchase identifier may be a code, a service, a keyword, a location, a name, a seller identifier, an address, a dealership, a manufacturer, and any combination of these. For example, in the case of a conveyance dealership, a purchase identifier may be an alphanumeric identifier corresponding to an oil change in a repair order. The oil change repair order may have several purchase identifiers. A purchase identifier may be extracted from the invoice data and saved in association with the invoice data in Dealer/Manufacturer Database 190. Alternatively, the purchase identifier may be flagged or otherwise marked for future extraction and/or retrieval.

In step 220, a targeted survey is generated based on the purchase data. The targeted survey may be generated by identifying a purchase of a product or service associated with the purchase data and retrieving survey questions associated with the purchase. In the context of FIG. 1, Survey Engine 140 may generate the survey based on questions retrieved from Survey Database 150 and store the targeted survey in Survey Database 150. Alternatively, Survey Engine 140 may provide the targeted survey to Application Server 120. Application Server 120 may store the targeted survey in association with Survey Management Application 122 in Survey Management Database 125. The targeted survey may include mandatory questions (i.e., survey questions that are asked in every targeted survey) and rotating questions (i.e., survey questions that are optional and may not be asked in every targeted survey). Any number of survey questions may be asked in the targeted survey. Further details as to the generation of a targeted survey with mandatory and rotating questions and a graphical user interface for the same are provided in the context of FIGS. 13-14.

In step 230, the targeted survey is provided to a customer. In some embodiments, the targeted survey is provided to Application Server 120, which then transmits the targeted survey via Network 110 (via Network Server 115 as shown in FIG. 1) to Browser 107 on Client 105. Alternatively, Application Server 120 may generate a web link and associate the targeted survey with the web link. The web link may be transmitted to E-mail Server 130 to be included in an e-mail message to the customer. One skilled in the art may recognize that although FIG. 1 shows an E-mail Server 130, any type of electronic communication (such as mobile communication) and corresponding network infrastructure is included in the scope of the embodiments described herein.

In step 240, a survey response is received from Client 105 via the web link. As discussed earlier, Client 105 may be any digital device configured to receive a user input corresponding to a survey response. The survey response may include, for example, a text string, a picture a negative response, a positive response, a character, a numeral, and any combination of these. The survey response may be stored in Survey Management Database 125 in association with, for instance, the targeted survey transmitted to the Client 105 in step 230.

In step 250, a weight may be assigned to a survey response. An assigned weight may be quantitative in that statistics may be computed based on numerical values associated with a plurality of survey responses in which the same survey question was asked. For instance, if a survey question from the targeted survey asked a customer to rate her satisfaction with dealership customer service on a scale of 1 to 10, the customer's survey response may indicate a number between 1 and 10. As such, this customer's survey response could then be compared to other targeted surveys in which this survey question was asked.

Survey questions in targeted surveys may be assigned weights, indicating that a particular survey response to a survey question is of higher importance than others. For instance, with respect to mandatory questions which may be asked in every targeted survey, a survey question regarding product knowledge of dealership staff may be of higher importance than a survey question regarding whether the customer was offered a test drive, and therefore, may be weighted more heavily. A weight for a particular survey response to a survey question may be predefined. For instance, the weight of the survey response may be computed based on a weight of the survey question when the targeted survey is generated in step 220. Alternatively, the weight of the survey response may be computed based on a defined weight in Survey Management Application 122 upon receipt of the survey response. Various metrics and/or operations may be performed on the survey response received in 240, and these will be described more fully herein.

In step 260, the weighted survey response may be transmitted for display on a display associated with a digital device. In some embodiments, the weighted survey response may be provided for display on Dealer/Manufacturer Server 195 or on a digital device coupled to Dealer/Manufacturer Server 195 (not shown in FIG. 1). Alternatively, the response may be provided for display on a display associated with Application Server 120, Client 105, and/or E-mail Server 130. The weighted survey response may be provided for display on a plurality of digital devices simultaneously in real time. In other words, the weighted survey response may be provided for display at a dealership and at a manufacturer in real time.

As mentioned earlier in the context of step 250, various operations may be performed on the survey response. For instance, each question from the targeted survey may be analyzed to determine whether a customer responded to the survey question, and which questions, if any, were answered most frequently. A score may be generated based on the survey response and the weight assigned to the survey response. Scores may be computed based on the nature of the survey response. For instance, if a survey question indicates that only two types of survey responses are possible (e.g., negative or positive responses, or yes/no responses), the score may correspond to the number of one type of response in view of the total number of survey questions. If a survey question indicates that the survey response must be based on a numeric scale (e.g., on a scale of 1 to 10) for each survey question, the score may correspond to a sum of numeric values associated with each survey question. Since different survey question types may be envisioned, one skilled in the art can envision a plurality of methods by which to score a survey response. In some embodiments, a report may be generated based on the survey response and the weight assigned to the survey response. Reports may be scheduled. They may be automatically generated by Survey Management Application 122, (e.g., on a weekly, biweekly, monthly, quarterly, or yearly basis). Reports may be stored in, for example, Survey Management Database 125. Report generation is further discussed herein in the context of FIG. 16.

Figure 6:
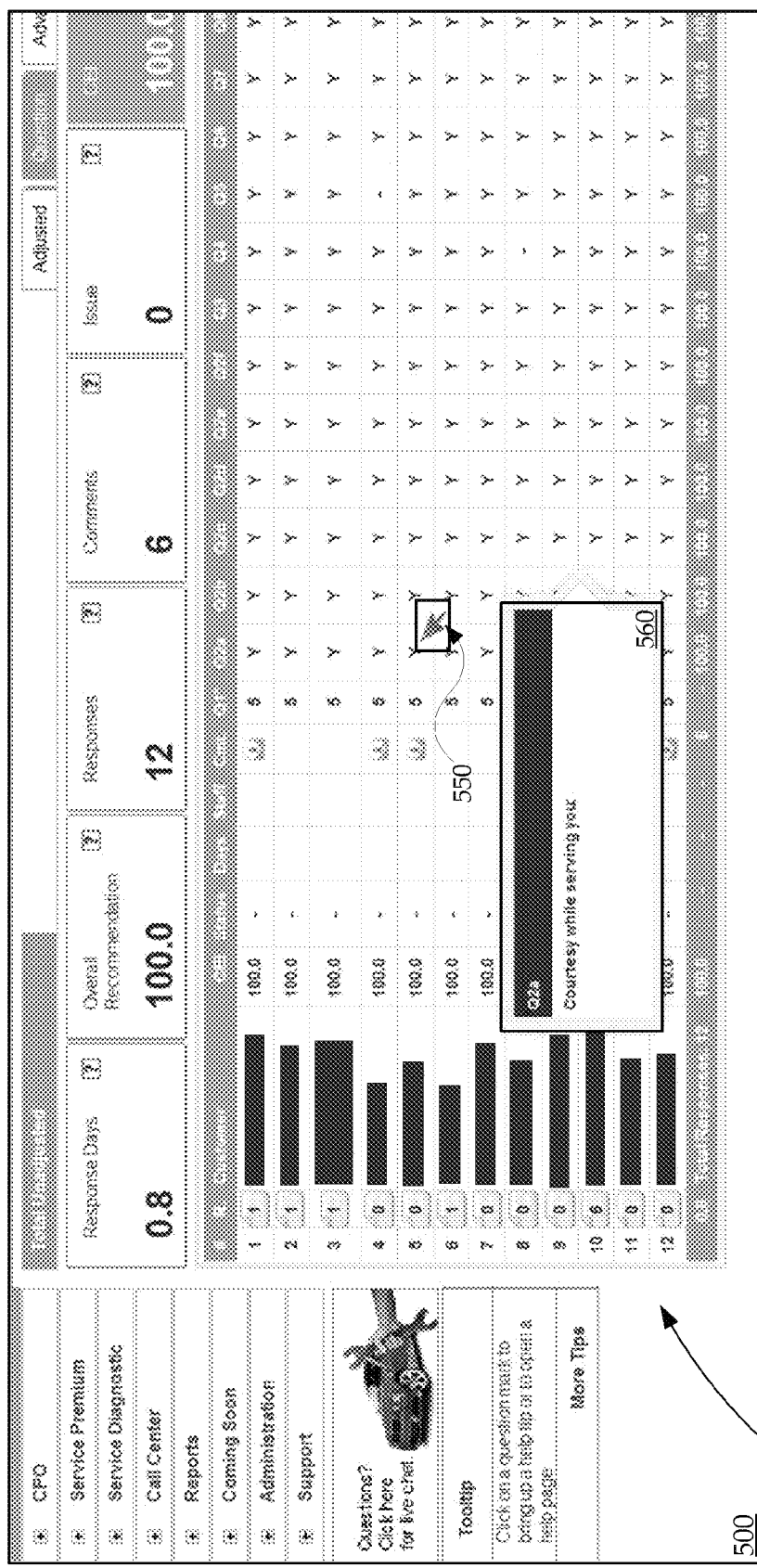
FIG. 6 illustrates an exemplary view of the GUI of FIG. 5.

Survey Management Application 122 may organize and display received survey responses. In some embodiments, survey responses may be displayed in association with a survey question in a targeted survey (as shown in FIG. 6). For example, Survey Management Application 122 may extract a conveyance identifier from the survey response and store the conveyance identifier in association with survey responses that share the same or acceptably similar conveyance identifier. An exemplary conveyance identifier may be, for example, a make and model, i.e. "2009 BMW 328i Convertible." In other words, Survey Management Application 122 may categorize a survey response with a conveyance identifier of "2009 BMW 328i Convertible" with survey responses having the same or acceptably similar conveyance identifier. An acceptably similar conveyance identifier may be, for example, "2009 BMW 328i." Survey Management Application 122 may provide these categorized survey responses in association for display. Survey responses may be categorized via any identifier in the survey response, such as dealership or employee identifiers, a keyword identifier (as described in the context of FIG. 3) and the like.

Survey Management Application 122 may evaluate and take action on survey responses. Survey Management Application 122 may allow administrators to set predefined thresholds or criteria for each question in the targeted survey. Upon receiving a survey response in step 240 and weighting in step 250, Survey Management Application 122 may identify each question from the targeted survey and compare the survey response to the predefined threshold of the targeted survey. Alternatively, if a score has been computed for the survey response, the score may be compared to the predefined threshold. If the survey response exceeds the predefined threshold, the survey response may be provided for display as described in the context of step 260.

Figure 10:
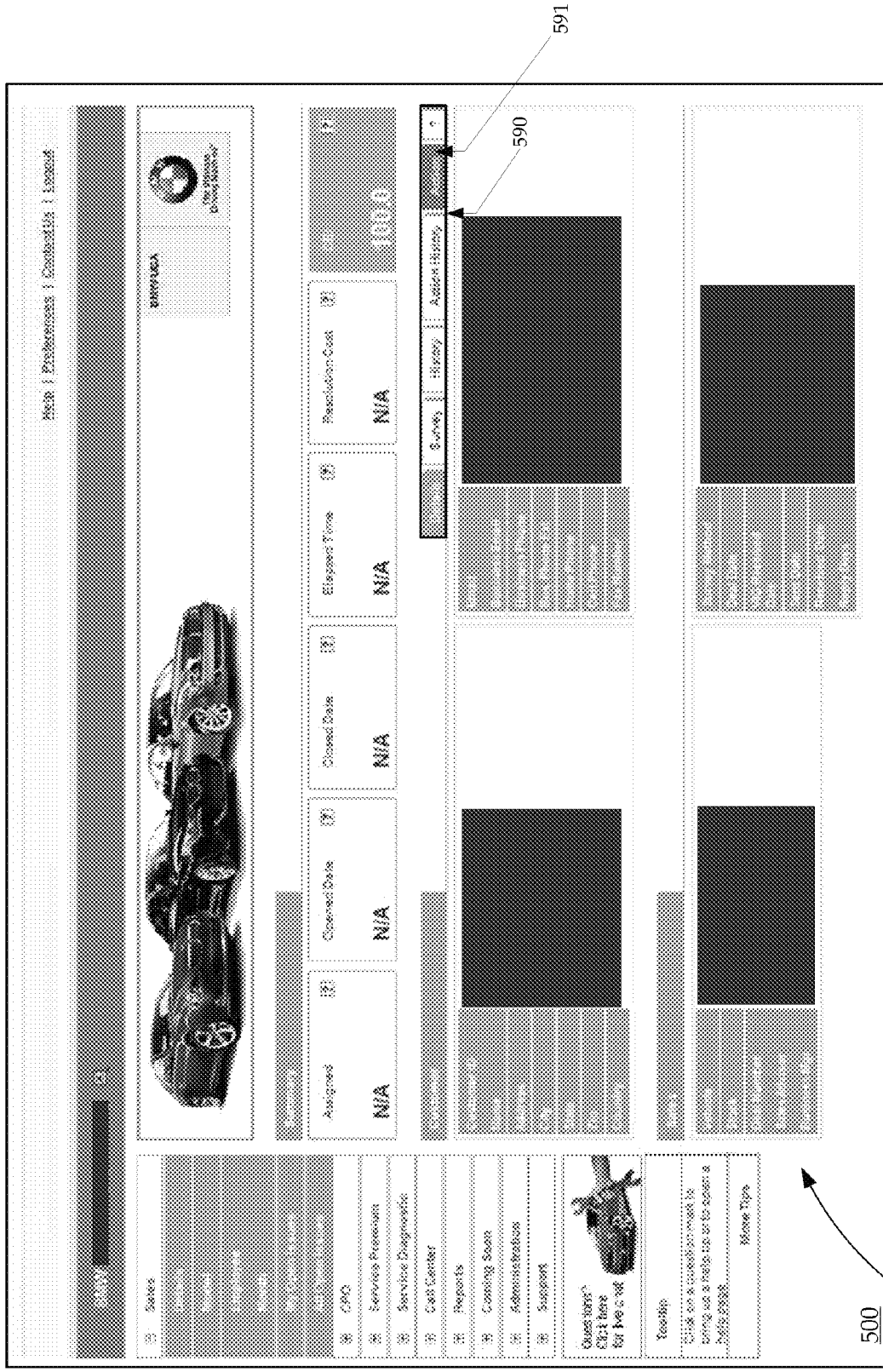
FIG. 10 illustrates an exemplary view of the GUI of FIG. 5.
Figure 11:
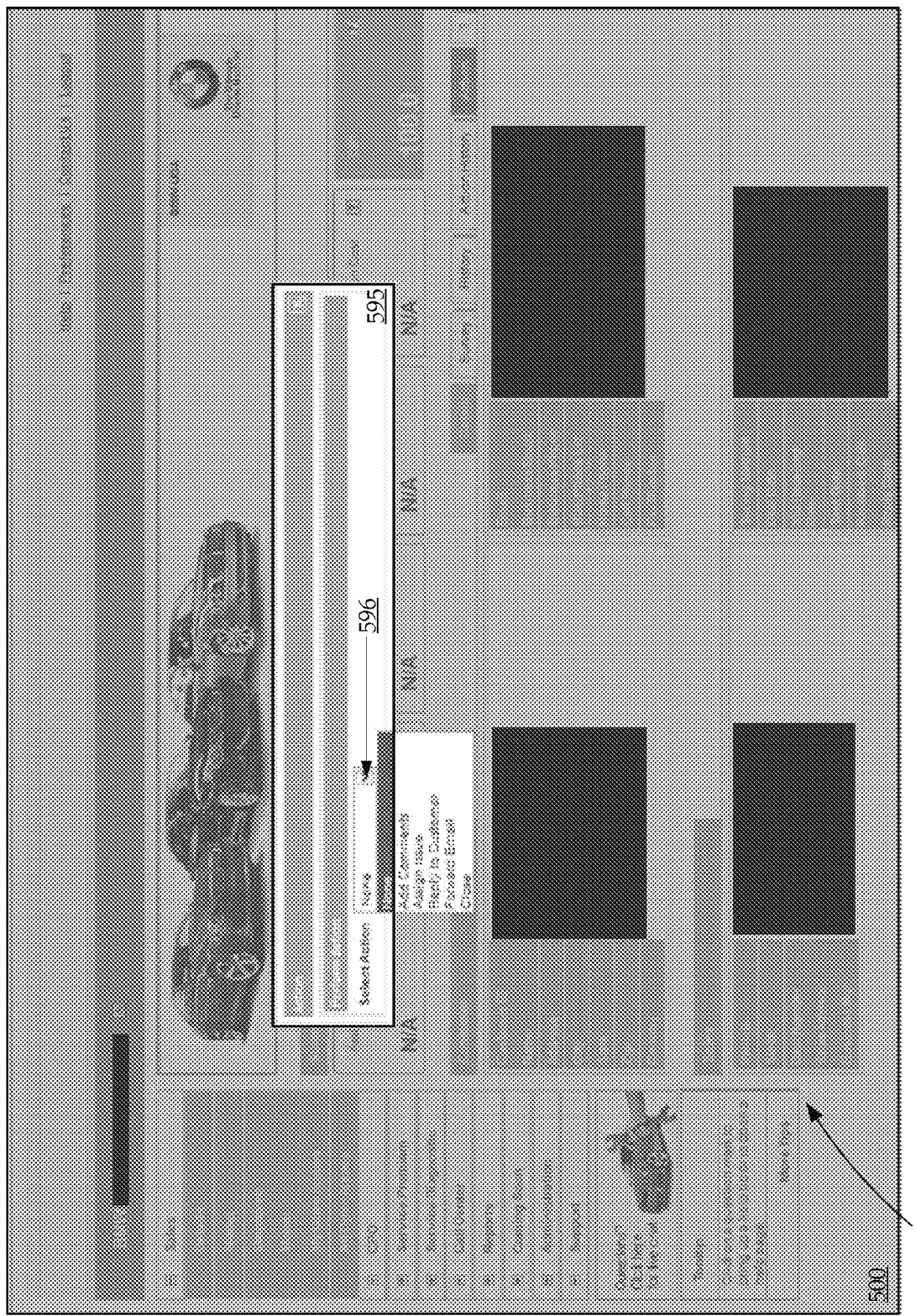
FIG. 11 illustrates an exemplary view of the GUI of FIG. 5.

If the survey response does not exceed the predefined threshold, (i.e. the survey response is below the threshold) the survey response may be flagged, and/or a visual indicator may be assigned to the survey response. The survey response may be categorized as, for example, an "Issue." Responsibility for addressing the "Issue" resulting from the survey response may be assigned to a survey manager. A survey manager may be a particular dealership personnel dedicated to processing and handling issues, or a particular sales advisor or business manager (as shown in FIGS. 10-11). In some embodiments, Survey Management Application 122 may initiate the generation of an alert for an "Issue," which is described in more detail herein. The survey response (with associated visual indicator) may be provided for display as is described in the context of step 260.

Figure 3:
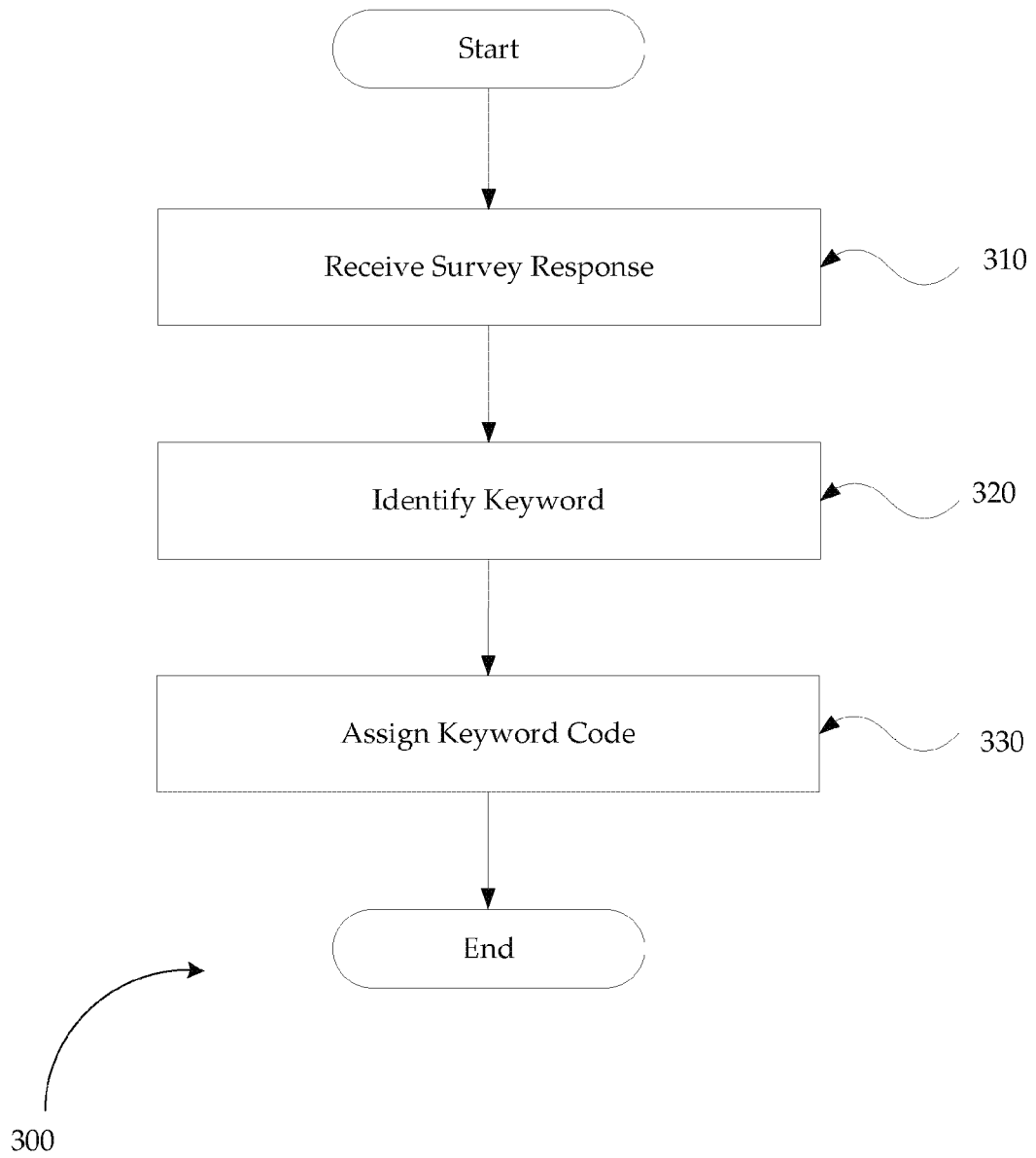
FIG. 3 is a flowchart of an exemplary method for identifying a keyword in survey data.

FIG. 3 illustrates an exemplary method 300 for survey management. The method 300 may be performed via a set of instructions stored on storage media and executed by a processor. In step 310, survey data is received via a network. The survey data may include a survey question, a survey response, a score based on the survey response, a name, a keyword, purchase data, and/or invoice data as discussed in the context of step 240 above. In step 320, a keyword may be identified in the survey data. Identification of the keyword may include identifying a noun and an adjective in a comment associated with a survey response. In some embodiments, the noun and adjective may be identified as a pair, e.g. "squeaky brake." Alternatively, the noun and adjective may be located independently of each other, i.e. "squeaky" and "brake" may trigger the identification of a keyword, but may not be present as a pair in the survey response. In step 330, a keyword identifier is assigned to the survey data. The keyword identifier is assigned to the survey data upon identification of the keyword in step 320.

The method 300 disclosed in FIG. 3 may be practiced in Networking Environment 100 as shown in FIG. 1 via Comment Scanner Module 170. Invoice data may be received from Dealer/Manufacturer Server 195 and stored in Dealer/Manufacturer Database 190. A keyword, for example "squeaky brake" may be present in the invoice data, for example, in a repair order for a "squeaky brake." Application Server 120 may therefore provide invoice data to Comment Scanner Module 170 prior to generation of the targeted survey, as discussed in the context of FIG. 2 in order to identify or locate a keyword. Alternatively, Application Server 120 may provide survey data to Comment Scanner Module 170 for identification of a keyword, i.e., after a survey response has been received in 240 (in the context of FIG. 2).

Comment Scanner Module 170 may be associated with a keyword database (not shown in FIG. 1) in which keywords may be stored in association with keyword codes. Keywords may be predefined based on, for example, dealership and/or manufacturer preferences. In some embodiments, Comment Scanner Module 170 may execute a text search of the survey data in order to identify the keyword. In some embodiments, Comment Scanner Module 170 may search for nouns in the keyword database, and then search for corresponding adjectives based on identified nouns. Alternatively, Comment Scanner Module 170 may search for adjectives in the keyword database and then search for corresponding nouns based on identified adjectives.

Upon identifying a noun and an adjective, Comment Scanner Module 170 may match the noun and the adjective with a keyword identifier. The invoice data and/or survey data searched in step 310 may be stored in, for example, Survey Management Database 125 in association with the keyword identifier. Survey Management Application 122 may take further action on the survey data upon association of the keyword identifier. For example, the survey data, in association with the identified keyword, may be provided for display on Dealer/Manufacturer Server 195. Survey Management Application 122 may initiate the generation of a report using a report scheduler module (not shown in FIG. 1) based on identification of the keyword from the survey data. Report scheduling is more fully discussed herein in the context of FIG. 16.

In some embodiments Survey Management Application 122 may take action on a survey response. Survey Management Application 122 may initiate or trigger the generation of an alert by Alert Module 160 (shown in FIG. 1). An alert may be triggered, for example, after a survey response is received by Application Server 120 in step 240. Survey Management Application 122 may, for example, trigger an alert in at least the following scenarios:

upon identification of a keyword in survey data or upon assigning a keyword identifier to survey data;

a score associated with a survey response does not exceed a minimum threshold set by an administrator of Survey Management Application 122;

a survey response reflects a negative response when a desired survey response is a positive response, and vice versa;

a name of an individual is identified in the survey data. The name of an individual may, if stored in the keyword database, may be considered a keyword.

In some embodiments, multiple alerts may be initiated by Survey Management Application 122. For example, multiple alerts may be initiated if two keywords are located in the survey data, or if two of the above scenarios are true for a survey response. Alert Module 160 may generate an appropriate alert based on, for example, the nature of the alert and/or preferences set by administrators of Survey Management Application 122. Exemplary alerts include, for example, generation of an e-mail message, an alarm, a multi-media message, a text message or SMS to a mobile device, a log event to, for example, Survey Management Database 125, and the like.

Figure 4:
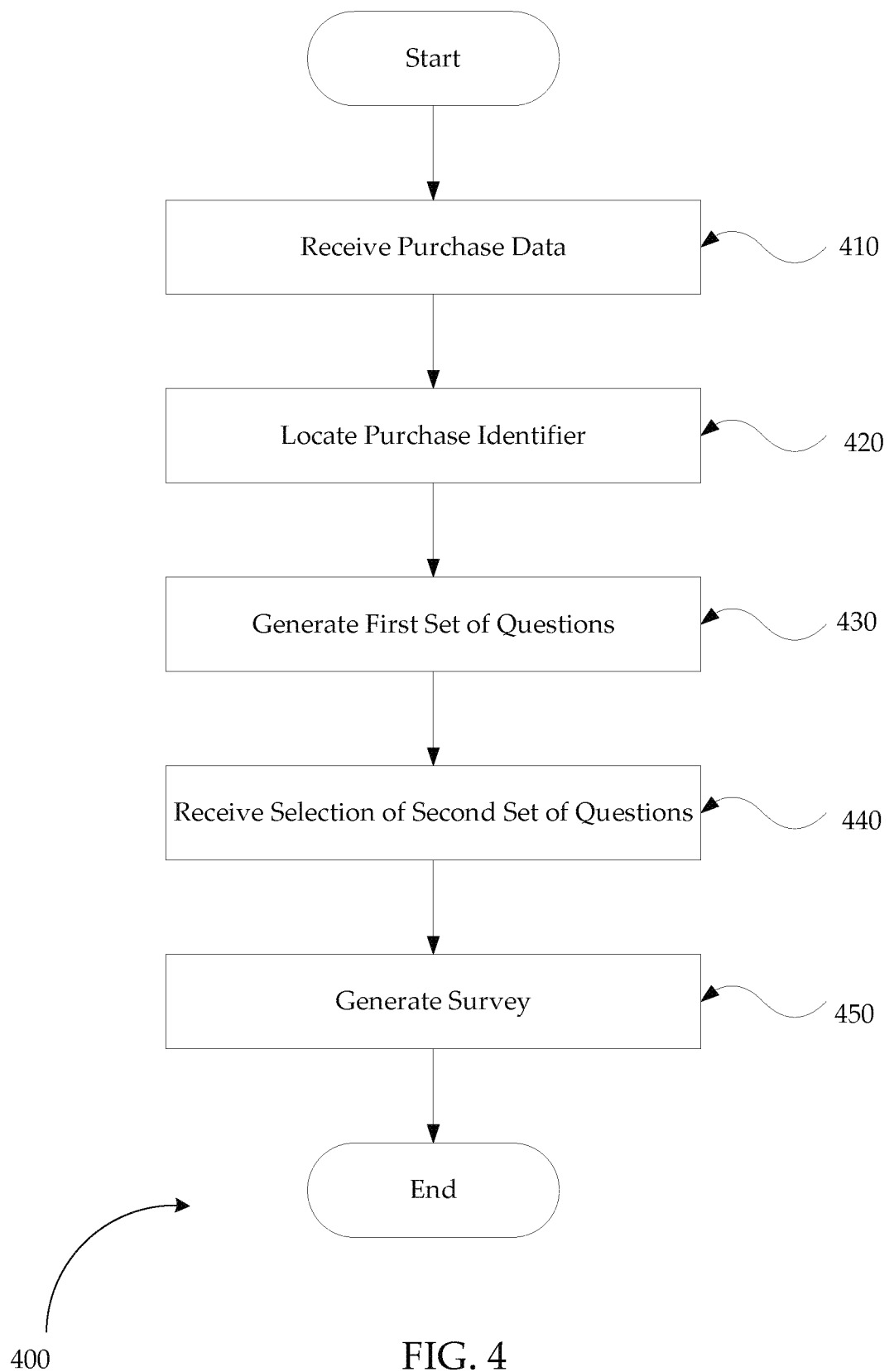
FIG. 4 is a flowchart of an exemplary computer-implemented method for generating a survey.

FIG. 4 illustrates an exemplary method 400 for generating a targeted survey, as is discussed in step 220 of method 200 (in context of FIG. 2). In step 410, purchase data is received via a computer network. In step 420, the purchase data is processed to locate a purchase identifier. A first set of questions is generated based on an identified purchase, based on the purchase identifier located in step 430. A selection of a second set of survey questions is received in step 440. The targeted survey, including the first and second sets of survey questions, is generated in step 450.

The method 400 disclosed in FIG. 4 may be practiced in Networking Environment 100, as shown in FIG. 1. Invoice data and/or purchase data may be received from Dealer/Manufacturer Server 195, optionally parsed by Data Feed Processor 197, and stored in Dealer/Manufacturer Database 190. Survey Engine 140 may process the purchase data in order to locate the purchase identifier. As discussed earlier, a purchase identifier may be a code, a service, a keyword, a location, a name, a seller identifier, an address, a dealership, a manufacturer, and any combination of these, as is discussed in the context of FIG. 2. Based on the purchase identifier, Survey Engine 140 may retrieve mandatory questions to be included in the targeted survey and provide the mandatory questions to Survey Management Application 122.

Survey Management Application 122 may include rotating questions in the targeted survey. In some embodiments, the rotating questions may be selected by Survey Management Application 122. In other embodiments, Survey Management Application 122 may include rotating questions selected by, for example, Dealer/Manufacturer Server 195. Survey Management Application 122 may provide Dealer/Manufacturer Server 195 with a selection of rotating questions based on an identifier, a keyword, a service, a product, a location, a customer, a dealership and any combination of these that may be found in invoice data and/or purchase data. Dealer/Manufacturer Server 195 may select any number of rotating questions to be included in the targeted survey. Alternatively, Survey Management Application 122 may place a restriction on how many rotating questions may be included in the survey. For example, Survey Management Application 122 may specify that only two questions from the rotating questions may be selected to be included in the targeted survey. The targeted survey may be transmitted to Client 105 via Network 110.

In some embodiments, Survey Engine 140 may locate a customer identifier from the purchase data and provide the customer identifier to Survey Management Application 122. Survey Management Application 122 may determine whether a targeted survey is generated for that customer. For instance, conveyance dealerships may not wish to survey certain customers, such as auction houses. Survey Management Application 122 may access, for example, data pertaining to such customers from Survey Management Database 125.

In some embodiments, a determination may be made as to whether each question from the first set of questions is unique from each question from the second set of questions. For example, Survey Management Application 122 may execute a search for identical text strings in the targeted survey in order to determine whether two questions or more questions in the targeted survey are identical. If identical text strings are detected, Survey Management Application 122 may request a further selection of rotating questions.

FIGS. 5-16 provide an exemplary graphical user interface for managing survey data, including generating targeted surveys. Although the following figures depict an automobile dealership and survey concerns relating thereto, one skilled in the art will appreciate, upon review of this disclosure, that the systems, methods, and media disclosed herein may be applicable to a plurality of verticals aside from the automotive vertical.

Figure 5:
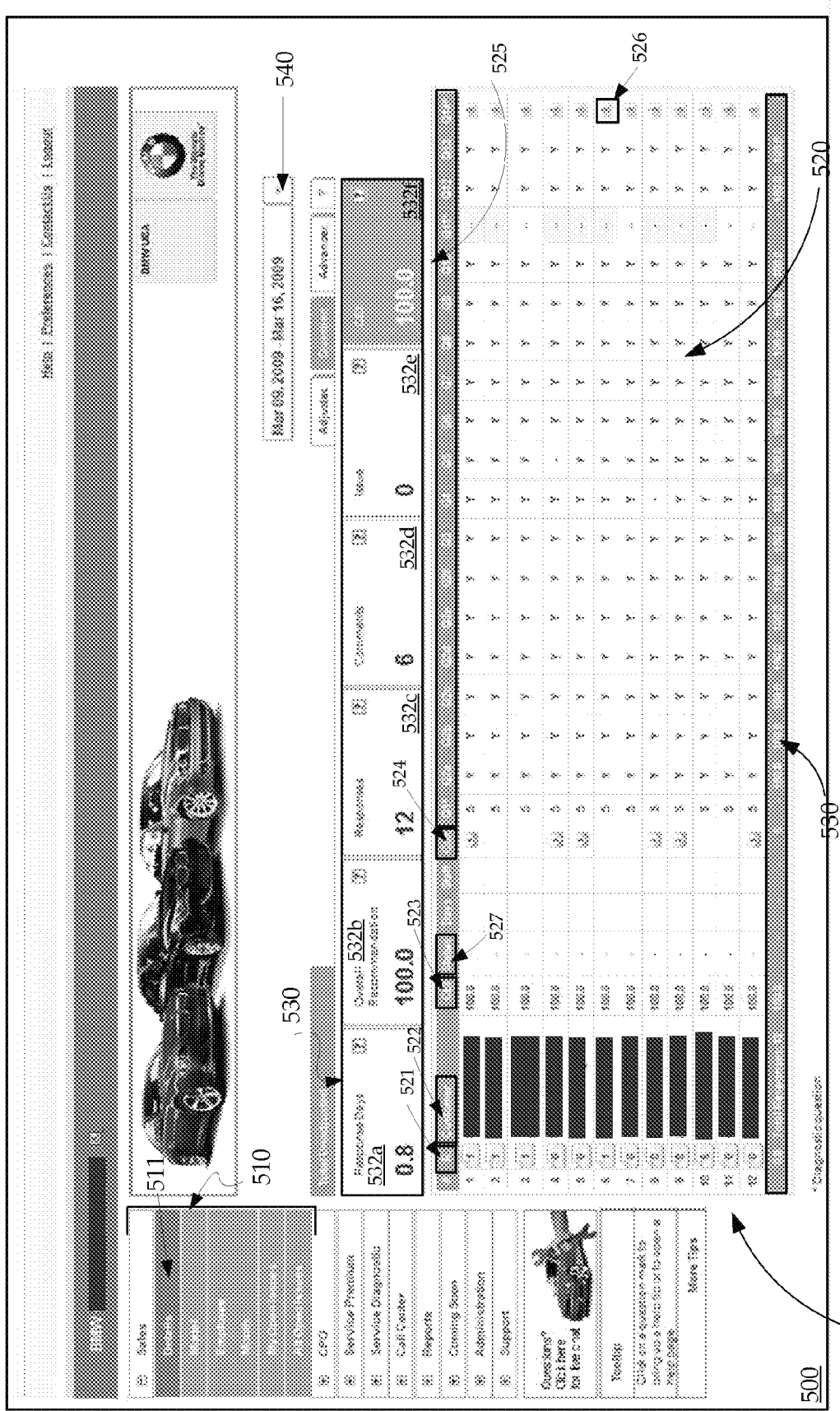
FIG. 5 illustrates an exemplary Graphical User Interface (GUI) for survey management in accordance with embodiments of the invention.

FIG. 5 illustrates an exemplary Graphical User Interface (GUI) 500 in accordance with embodiments of the invention discussed herein. GUI 500 may provide survey data for display as discussed in the context of FIGS. 1, 2, and 3. For example, GUI 500 may be a graphical user interface associated with Survey Management Application 122 and provided via Network 110 to, for example, Dealer/Manufacturer Server 195 or to, for example, a client associated with Dealer/Manufacturer Server 195 (not shown in FIG. 1). GUI 500 may be provided for display on a digital and/or display device associated with Dealer/Manufacturer Server 195 via a browser (not shown in FIG. 1). A user may log into Survey Management Application 122 and navigate GUI 500 via user input to a digital device. Exemplary user inputs may include a mouse click, a mouse double click, a roll-over of a mouse pointer, a key press, a selection of an icon, a selection of an area of a screen using a click and drag, and the like. Components relating to survey management may be displayed on GUI 500. FIG. 5 illustrates Navigation Bar 510, Survey Response Display 520 with Survey Questions 525, Survey Metrics Display 530 with survey metrics indicators 532 displayed thereon, and Date Range Display 540.

When a user logs into Survey Management Application 122, a user may navigate Tabs 511 of Navigation Bar 510 in order to view survey data. Navigation Bar 510 as shown in FIG. 5 may have any number of tabs 511 which may correspond to any number of views of GUI 500. For example, in FIG. 5 GUI 500 displays a Details View 501 associated with Survey Response Display 520. In some embodiments, Details View 501 may display a number of response days 521, a customer name 522 (customer names not shown in FIG. 5 for privacy), a Customer Experience Index (CEI) 523, a comment 524, and survey questions 525. An activated tab may indicate activation of a view via a visual indicator on the tab 511. For example the Details tab of Navigation Bar 510 is grayed out, indicating that Details View 501 is provided for display by Survey Management Application 122.

In some embodiments, Survey Response Display 520 may be organized as a grid as shown in FIG. 5. A targeted survey as discussed in the context of FIG. 2 may be represented as a row in Survey Response Display 520. The columns of Survey Response Display 520 may represent a number of response days 521, a customer name 522, a CEI 523, a comment 524, and survey questions 525 as shown in FIG. 5. As such, the cells of Survey Response Display 520 may reflect a survey response to a survey question. Survey responses may be displayed, for examples as a character (as shown in FIG. 5), a numeral, a color, an icon, and any combination of these. One skilled in the art will recognize that any number of rows and/or columns may represent any number of variables in Survey Response Display 520.

In some embodiments, weights may be applied to survey responses as discussed in the context of FIG. 2. Survey responses may be displayed in Survey Response Display 520 in association with a weight display (not shown in FIG. 5). A survey tracking display may be displayed in Survey Response Display 520 as shown in Status 527. Status 527 may be configured to display a status of a targeted survey, for example, an indicator associated with whether a survey has been resent to a customer, as discussed in the context of FIG. 1.

Survey Metrics Display 530 may provide survey metrics indicators 532a-f associated with the survey responses shown in Survey Response Display 520. Survey Metrics Display 530 may, for example, display Response Days 532a, Overall Recommendation 532b, Responses 532c, Comments 532d, Issue 532e, and CEI 532f. Response Days 532a may indicate the average number of days customers took to provide a survey response. Responses 532c may indicate a number of received survey responses. Comments 532d may indicate a number of received comments associated with the survey responses. Issue 532e may indicate a number of issues associated with the survey responses. CEI 532f may indicate a Customer Experience Index score associated with the survey responses. In some embodiments, CEI 532f may represent a weighted average of the survey responses as discussed in the context of 250 in FIG. 2 above, and a corresponding weight display may be displayed in survey metric indicator 532. In some embodiments Survey Metrics Display 530 may form a portion of Survey Response Display 520 as shown in FIG. 5.

In some embodiments, Survey Metrics Display 530 may display a survey metric indicator 532 corresponding to a single survey question. For example, Overall Recommendation 532b may indicate the percentage of survey responses that indicated a recommendation of the automobile dealership. As shown in FIG. 5, Overall Recommendation 532b is Q14 as indicated by icon 526.

Date Range Display 540 may indicate a date range associated with the survey responses displayed in Survey Response Display 520. In some embodiments, the date range may correspond to a receipt date of a survey response. FIG. 5 shows a date range view associated with Details View 501. Date Range Display 540 displays dates ranging from Mar. 9, 2009-Mar. 16, 2009, indicating that the survey responses displayed in Survey Response Display 520 were received on or between those calendar dates. Any range of dates may be displayed in Date Range Display 540. Date Range Display 540 is further discussed in the context of FIG. 7.

FIGS. 6-11 illustrate further features and/or views of the GUI 500 in accordance with embodiments of the present invention. These features and/or views are accessible via user input to any of 510-540 discussed in the context of FIG. 5.

FIG. 6 illustrates a Survey Question View 502 of GUI 500. Survey Question View 502 may be displayed upon a user input to Survey Response Display 520. In some embodiments, Survey Question View 502 may be displayed independently of Survey Response Display 520 (not shown). Alternatively, Survey Question View 502 may be displayed as an overlay view over Survey Response Display 520, as shown in FIG. 6. For example, a user input, illustrated by cursor 560, may be made to a survey response in column Q2a and row 5 of Survey Response Display 520. Column Q2a of Survey Response Display 520 may correspond to Question 2a of the targeted survey sent to Client 105, and as such, "Q2a" may serve as a survey question identifier. Upon receipt of the user input by Application Server 120, Survey Management Application 122 may provide the survey question for display via Survey Question Display 550. In some embodiments, Survey Question Display 550 may display the survey question, a survey question identifier, and any combination of these as shown in FIG. 6. It is apparent to one skilled in the art that any survey data may be displayed in Survey Question View 502.

Figure 7:
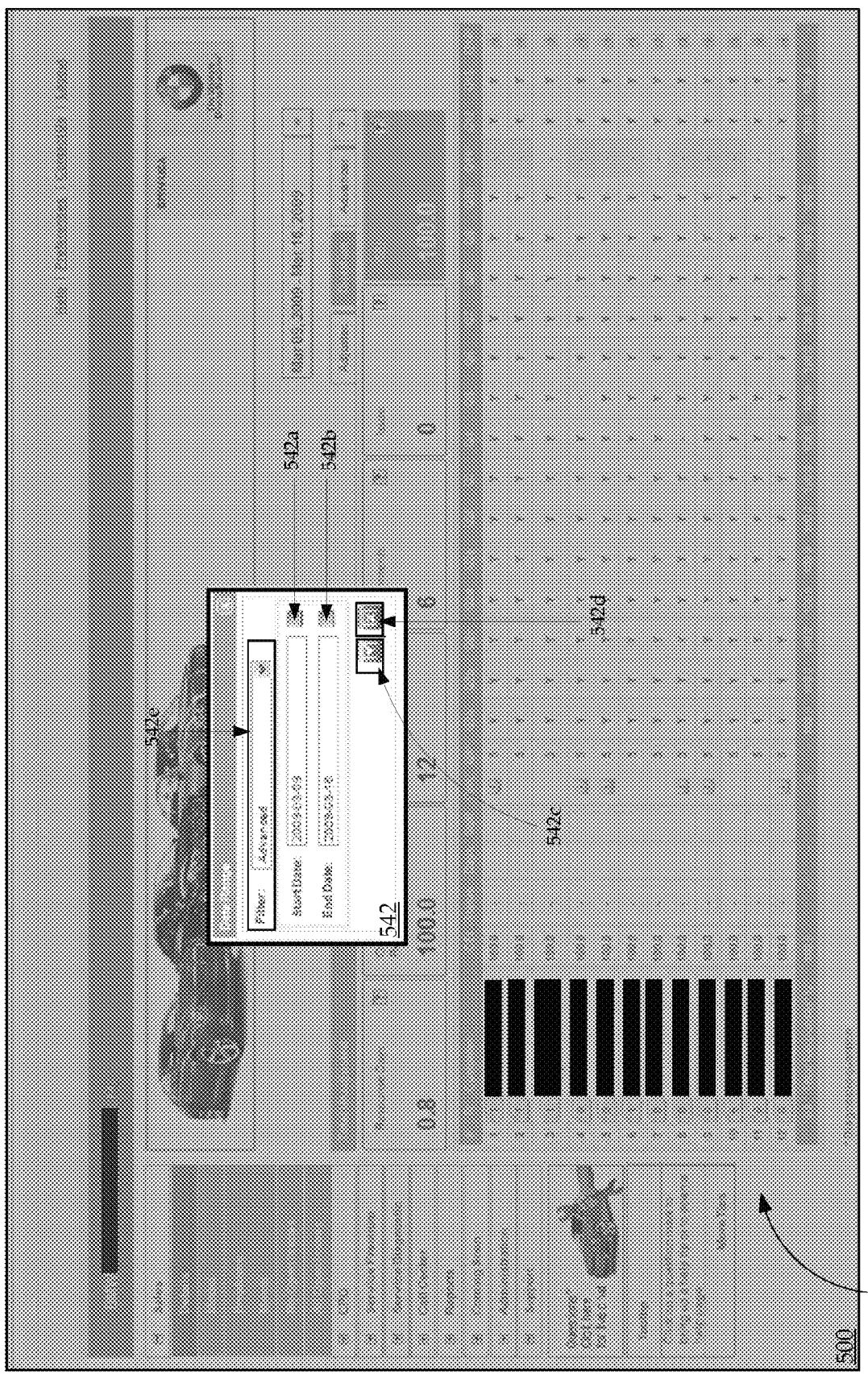
FIG. 7 illustrates an exemplary view of the GUI of FIG. 5.

FIG. 7 illustrates a Date Range View 503 of GUI 500. A user input, such as the user input discussed in the context of FIG. 6, may be made to Date Range Display 540. Survey Management Application 122 may return a Date Range Menu 542 having a plurality of date range filters 542e. Any number and type of date range filters 542e may be applied to Survey Response Display 520. Exemplary filters include "Last Login" for a filter selected most recently, "Last 7 Days" for survey responses received in the seven days prior, "Last 14 Days" for survey responses received in the fourteen days prior, "Last 30 Days" for survey responses received in the thirty days prior, "Current Month" for survey responses received from the first of the month to the current date, or "Advanced." An "Advanced" filter may allow for survey responses to be displayed within a range of dates, or date range. Start Date Indicator 542*a* and End Date Indicator 542*b* may be shown. A user input to the indicators may display a desired start date and end date for display, thereby specifying a date range. In some embodiments, Survey Management Application 122 may disable other features of GUI 500 and indicate that GUI 500 is disabled via a gray overlay as shown in FIG. 7. The date range displayed in Date Range View 503 may be accepted via user input to 542*c*. Date Range View 503 may be cancelled via user input to 542*d*.

Figure 8:
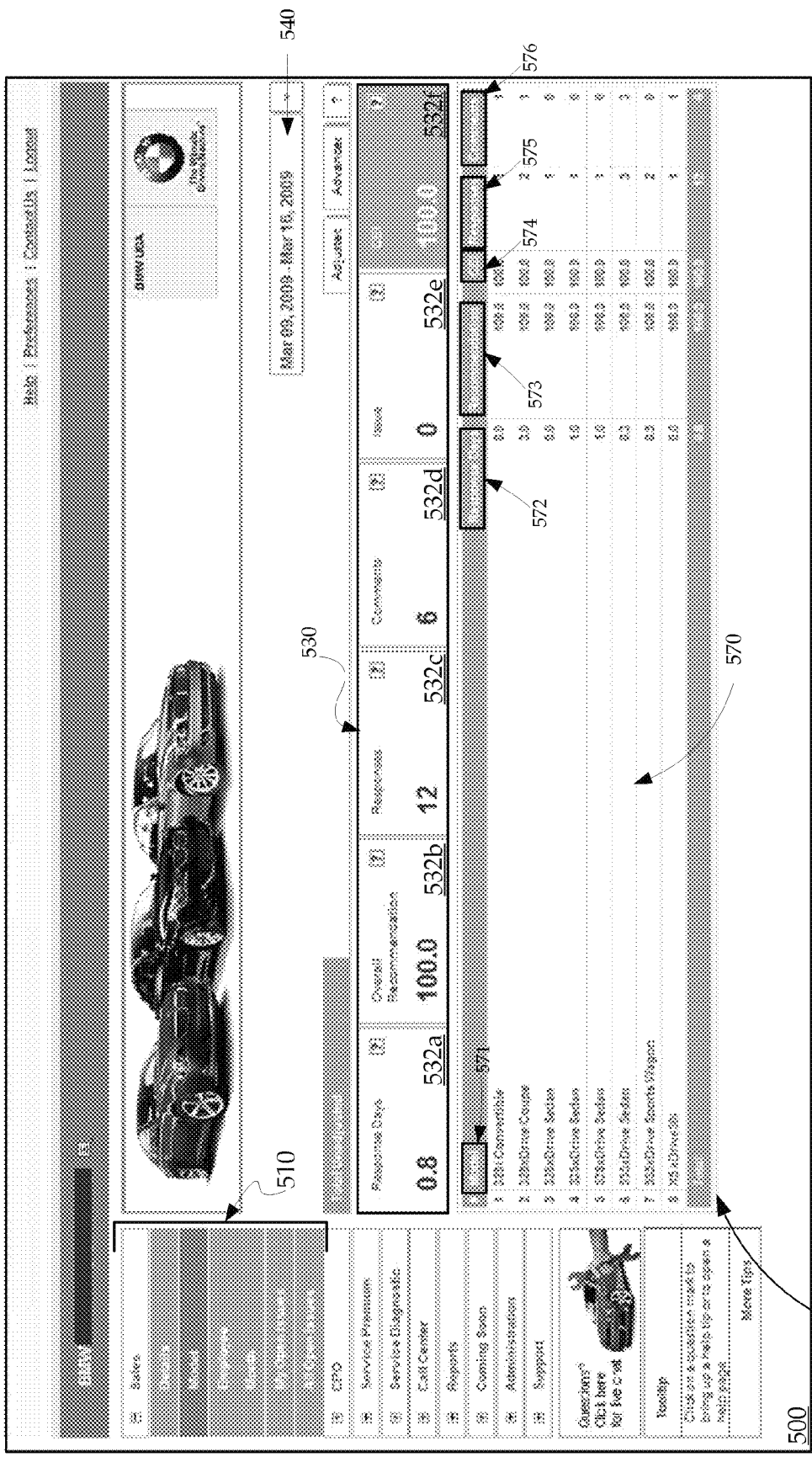
FIG. 8 illustrates an exemplary view of the GUI of FIG. 5.

FIG. 8 illustrates a Model View 504 of GUI 500 in accordance with embodiments of the present invention discussed herein. Model View 504 may display Navigation Bar 510 with Model tab 511 grayed out. A Model Interface 570 may be provided for display on GUI 500. Model Interface 570 may organized in a grid as shown. The rows of the grid may represent a model of automobile for which a survey response has been received. The columns of Model Interface 570 may represent a model type 571, a number of response days associated with a survey response 572, an overall recommendation 573, a CEI 574, a number of responses received 575 and a number of comments received 576.

Figure 9:
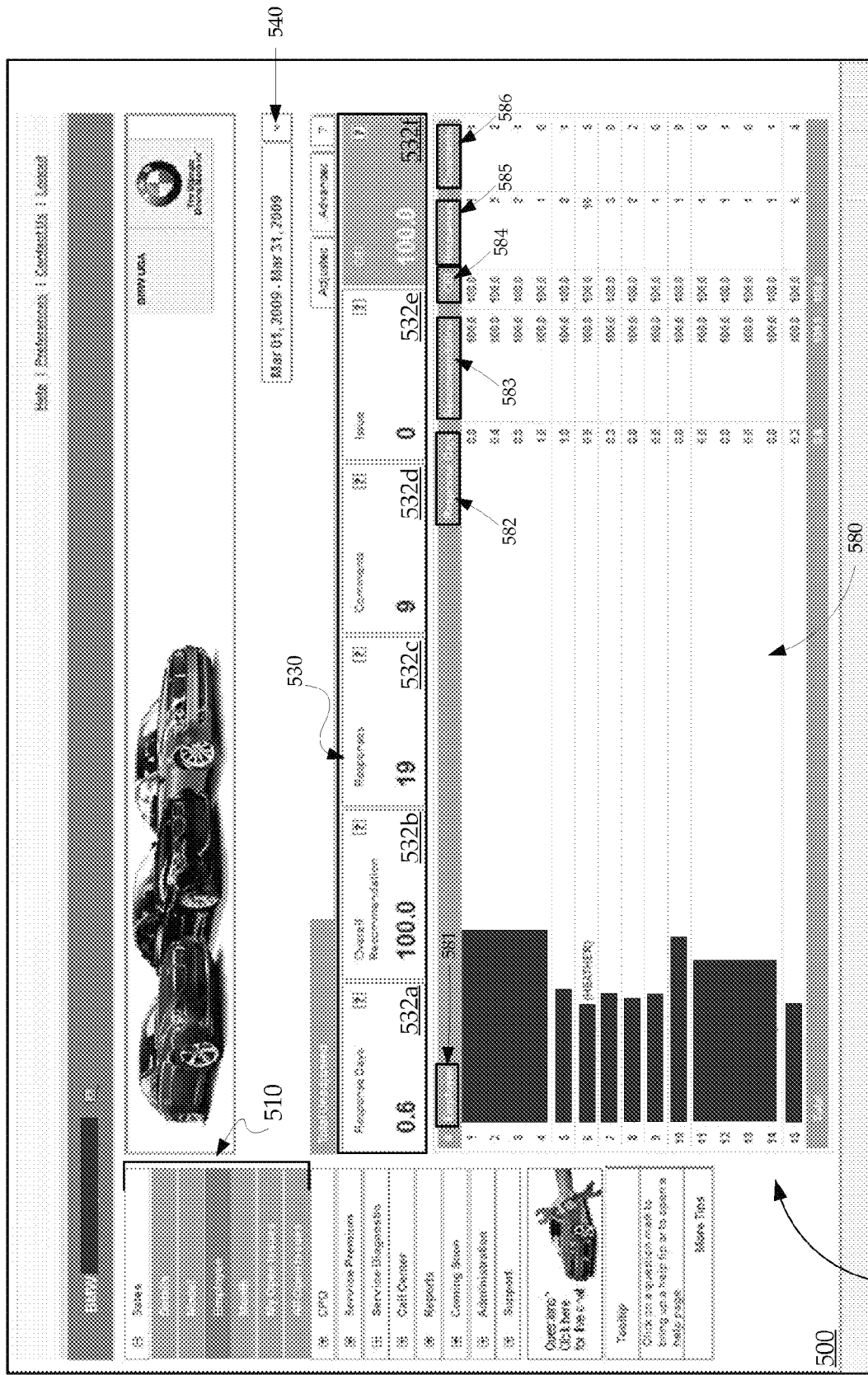
FIG. 9 illustrates an exemplary view of the GUI of FIG. 5.

In providing Model Interface 580 for display, Survey Management Application 122 may categorize or group survey responses by model type and represent grouped aggregates by a single row as shown in FIG. 9. As such, the cells of Model Interface 580 may reflect survey metrics corresponding to each group of survey responses. Survey Metrics Display 530 may provide survey metrics indicators 532*a-f* associated with the survey responses shown in Employee Interface 580. Survey Metrics Display 530 may form a portion of Employee Interface 580 as shown in FIG. 9. Date Range Display 540 may indicate the responses for which survey responses are represented in Model Interface 580.

In some embodiments, user input to Model Interface 570 may provide Survey Response Display 520*a* (not shown). Survey Response Display 520*a* may represent a targeted survey as discussed in the context of FIG. 2 as a row. The columns of Survey Response Display 520*a* may represent a number of response days 521, a customer name 522, a CEI 523, a comment 524, and survey questions 525 as shown in FIG. 5. Survey Response Display 520*a* may differ from Survey Response Display 520 in that the survey responses displayed in Survey Response Display 520*a* may correspond to a particular model of automobile. For example, upon a user input to model type "BMW 328i Convertible", Survey Management Application 122 may provide for display survey responses associated with the BMW 328i convertible, or acceptably similar models, for example BMW 328i. In some embodiments, an alias or alphanumeric code may be used to identify the model.

FIG. 9 illustrates an Employee View 505 of GUI 500 in accordance with embodiments of the present invention discussed herein. Employee View 505 may display Navigation Bar 510 with Employee tab 511 grayed out. An Employee Interface 580 may be provided for display on GUI 500. Employee Interface 580 may be organized in a grid as shown. The rows of the grid may represent an employee of the automobile dealership who may be associated with survey response. The columns of Employee Interface 580 may display, for example an employee name or other employee identifier 581, a number of response days associated with a survey response 582, an overall recommendation 583, a CEI 584, a number of responses received 585 and a number of comments received 586.

In providing Employee Interface 580 for display, Survey Management Application 122 may categorize or group survey responses by employee and represent grouped aggregates by a single row as shown in FIG. 9. As such, the cells of Employee Interface 580 may reflect survey metrics corresponding to each group of survey responses. Survey Metrics Display 530 may provide survey metrics indicators 532*a-f* associated with the survey responses shown in Employee Interface 580. Survey Metrics Display 530 may form a portion of Employee Interface 580 as shown in FIG. 9. Date Range Display 540 may indicate the responses for which survey responses are represented in Employee Interface 580.

In some embodiments, user input to Employee Interface 580 may provide Survey Response Display 520*b* (not shown). Survey Response Display 520*b* may represent a targeted survey as discussed in the context of FIG. 2 as a row. The columns of Survey Response Display 520*b* may represent a number of response days 521, a customer name 522, a CEI 523, a comment 524, and survey questions 525 as shown in FIG. 5. Survey Response Display 520*b* may differ from Survey Response Display 520 in that the survey responses displayed in Survey Response Display 520*b* may correspond to a particular employee of the automobile dealership. For example, upon a user input to employee identifier "Heather", Survey Management Application 122 may provide for display survey responses associated with the employee "Heather". In some embodiments, an employee identifier, such as an alias or alphanumeric code, may be used to identify the employee.

FIG. 10 illustrates a Customer Summary View 506 of GUI 500 in accordance with embodiments of the present invention discussed above in the context of FIG. 5. In some embodiments, Survey Management Application 122 may transmit Customer Summary View 506 upon a user input to a customer name 522 as shown in FIG. 5. Contact information, sales or service information (service details not shown), and survey data (e.g. "Deal Date" and "Received Date" of the targeted survey) may be displayed in Customer Summary View 506. Survey Metrics Display 530 may be shown, for example, if there are two or more targeted surveys associated with the customer.

In some embodiments, Customer Summary View 506 is configured for user input, for example, via Customer Navigation Bar 590. Survey Management Application 122 may provide further views of customer data upon receiving a user input to Customer Summary View 506 (further views not shown in FIG. 10). For example, customer data provided by Survey Management Application 122 may include a targeted survey and/or survey response associated with the customer, a customer's history with the automobile dealership and/or manufacturer, or any actions taken on the part of dealership personnel or a survey manager with respect to customer data.

FIG. 11 illustrates a Customer Action View 507 that may be provided by Survey Management Application 122 upon receiving a user input to the Action Tab 591 of Customer Navigation Bar 590 in FIG. 10. In some embodiments, an Action Interface 595 with Action Menu 596 may be displayed. Action Menu 596 may provide options for various actions that may be taken with respect to customer data and/or survey data. For example, "Add Comments" may allow for a comment to be added to a survey response and/or targeted survey. "Assign Issue" may allow user input for assigning a survey response as an "Issue" as discussed in the context of FIG. 2. "Reply to Customer" and "Forward E-mail" may optionally be included in Action Menu 596 as shown in FIG. 11.

FIGS. 12-16 illustrate several views of an exemplary Graphical User Interface (GUI) 1200 which may be used to generate a targeted survey, as discussed in the context of FIGS. 1, 2, and 3. GUI 1200 may be a graphical user interface associated with Survey Management Application 122. In some embodiments, GUI 1200 may be associated with GUI 500.

Figure 12:
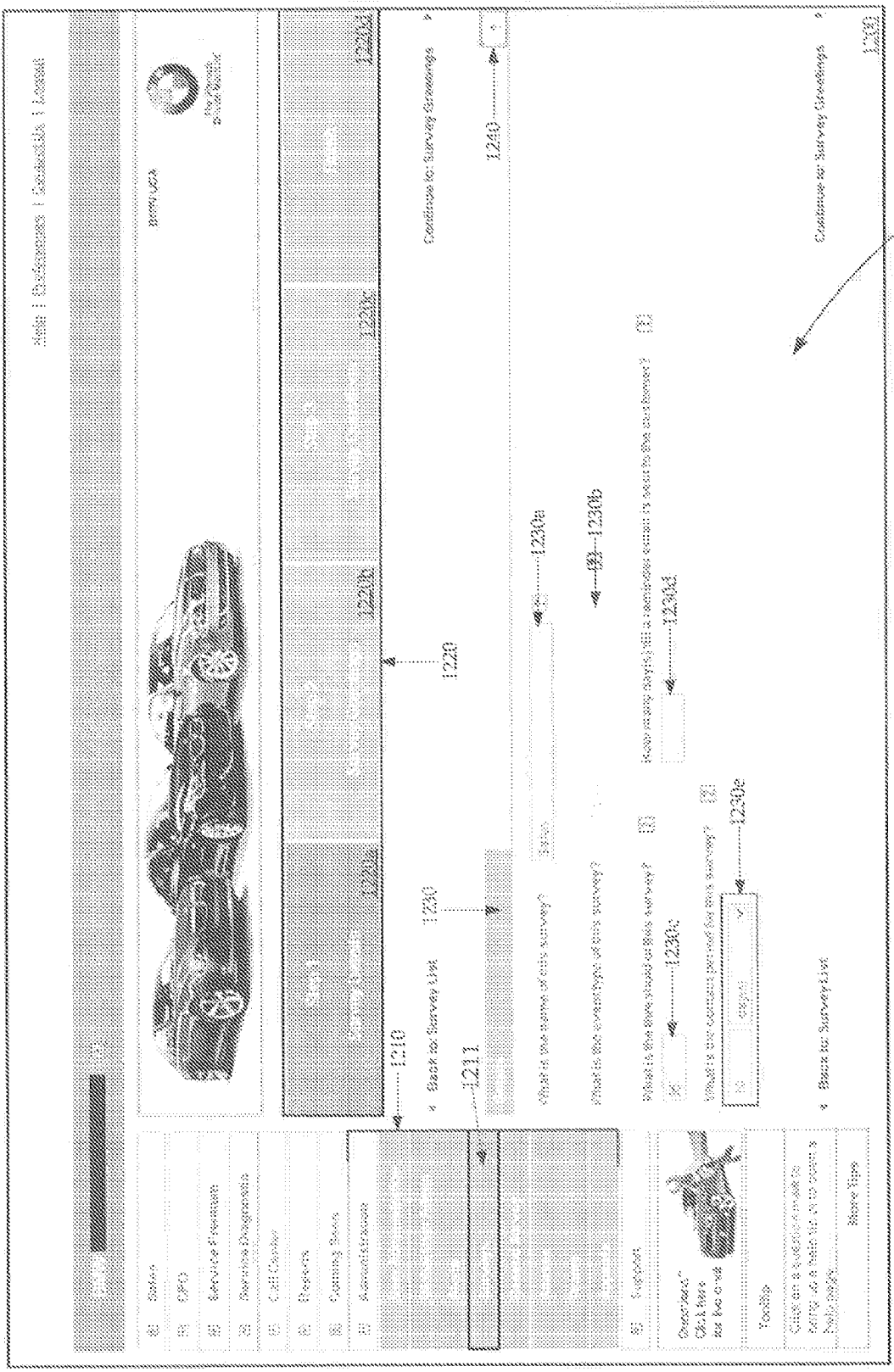
FIG. 12 illustrates an exemplary Graphical User Interface (GUI) for generation of targeted surveys in accordance with embodiments of the invention.

A user may log into Survey Management Application 122 and navigate GUI 1200 via user input to a digital device. Components relating to survey generation may be displayed on GUI 1200. FIG. 12 illustrates Navigation Bar 1210, Survey Step Toolbar 1220 showing survey steps indicators 1220a-1220d, and Survey Details View 1201, having Survey Generation Display 1230 including Survey Details Fields 1230a-1230e.

When a user logs into Survey Management Application 122, the user may navigate Tabs 1211 of Navigation Bar 1210 in order to generate a targeted survey. Upon activation of the Surveys Tab 1211, GUI 1200 may be provided by Survey Management Application 122 for display. Navigation Bar 1210 as shown in FIG. 12 may have any number of tabs 1211. For example, in FIG. 12, GUI 1200 displays Survey Details View 1201 upon activation of the Surveys Tab 1211. Survey Details View 1201 may display a survey name 1230a, an event type 1230b, a threshold 1230c, and a contact period 1230e for the survey about to be generated. In some embodiments, a reminder e-mail may be generated in association with the targeted survey and transmitted to Client 105 a period of time after the targeted survey has been transmitted. Such a period of time may be specified in 1230d. Any number of fields 1230 may be provided in Details View 1201.

Survey Step Toolbar 1220 includes survey steps indicators 1220a-1220d. Survey Step Toolbar 1220 may include any number of survey step indicators 1220a-1220d, and survey step indicators 1220a-1220d may be shown in any order. Survey step indicators may provide text, color, graphics, and/or any combination of these to provide information as to the progress of the generation of the targeted survey. For example, in FIG. 12, survey step indicator 1220a shown as grayed, indicating that the generation of the targeted survey is at "Step 1." In some embodiments, survey step indicators 1220a-1220d may be configured for user input in order to navigate various views of GUI 1200. Alternatively, Arrow Icon 1240 may be used to navigate the various views of GUI 1200.

Figure 13:
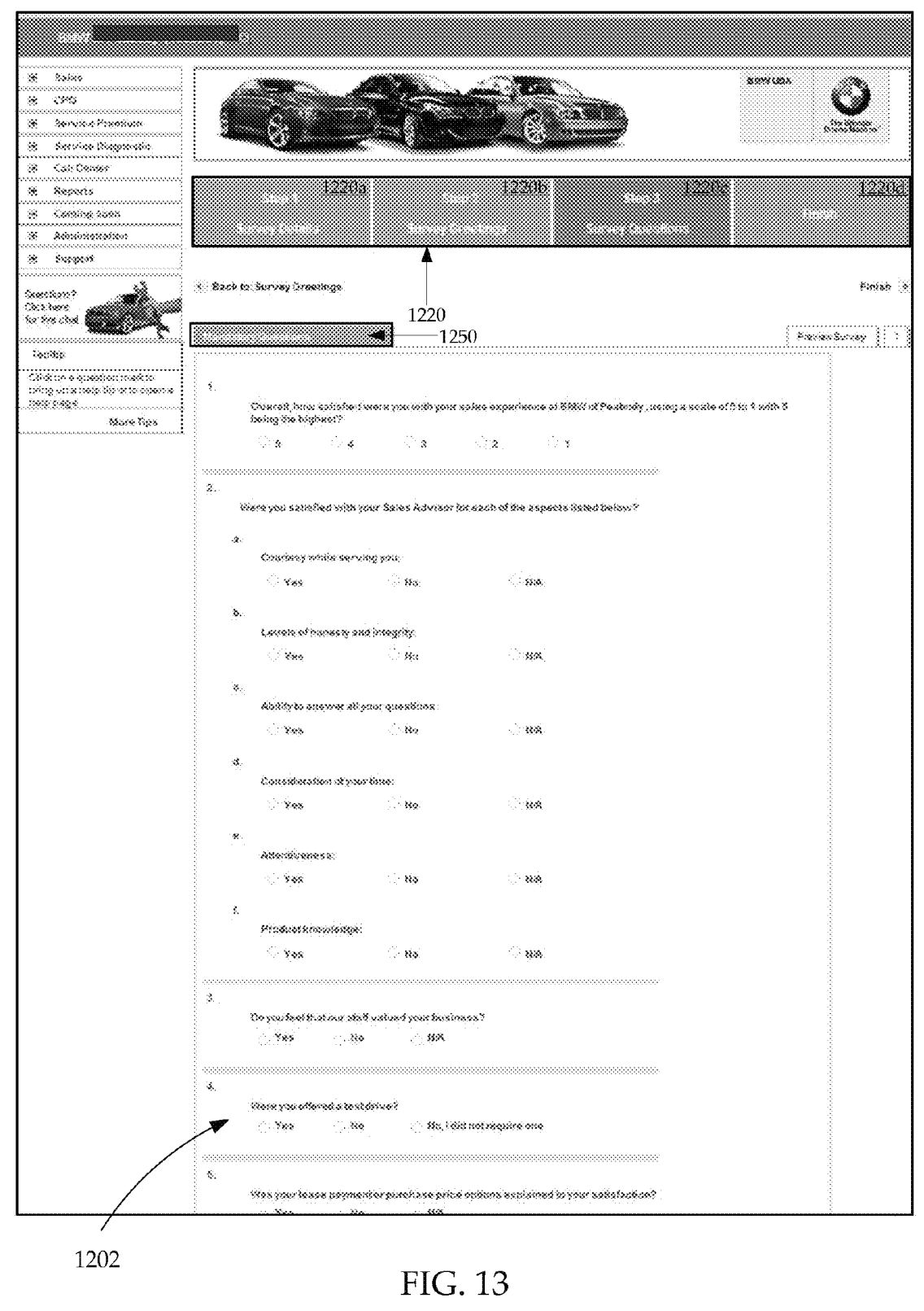

FIG. 13 illustrates a Survey Questions View 1202 which have been selected to be included in the targeted survey. Survey Questions View 1202 displays an exemplary set of questions generated based on, for example, purchase data received from Dealer/Manufacturer Server 195 as described in the context of FIG. 1. Survey step indicator 1220c is grayed as shown in FIG. 13, indicating that the generation of the targeted survey is at "Step 3." In some embodiments, the set of questions may be mandatory questions. Mandatory questions may be pre-selected for inclusion in a survey based on purchase data and/or other administrative criteria. In FIG. 13, mandatory questions tab 1250 displays a set of mandatory questions to be asked in the targeted survey.

In some embodiments, rotating questions or optional questions may be included in the targeted survey. FIG. 14 illustrates an exemplary Optional Questions Interface 1260. Optional Questions numbered 1-10 are shown in FIG. 14. However, any number of Optional Questions may be displayed. Optional Questions Interface 1260 may be configured for user input. In some embodiments, radio buttons 1262 may be associated with Optional Questions as shown in FIG. 14. A selection of a radio button 1262 may indicate the selection of an Optional Question for inclusion in the targeted survey. For example, in FIG. 14, Optional Question 1 has been selected for inclusion in the targeted survey. A user input to Checkbox Icon 1264 may submit the selected Optional Question 1 to Survey Management Application 122. Optional Questions Interface may be closed via input to Close Window Icon 1266.

Inputs from GUI 1200 may be transmitted to Survey Management Application 122 for generation of the targeted survey. Generation of the targeted survey may include incorporating data from Survey Details View 1201, data from Survey Questions View 1202 and/or data from Optional Questions Interface 1260. Survey Management Application 122 may access Survey Database 150 to retrieve mandatory and/or rotating questions and retrieve a template from Templates Library 180 to format the targeted survey. Upon generation of the targeted survey with the mandatory and/or rotating questions, Survey Management Application 122 may provide the targeted survey for display (not shown) as a "preview." Further steps may be practiced as disclosed in the context of FIG. 2 upon generating the targeted survey.

Figure 15:
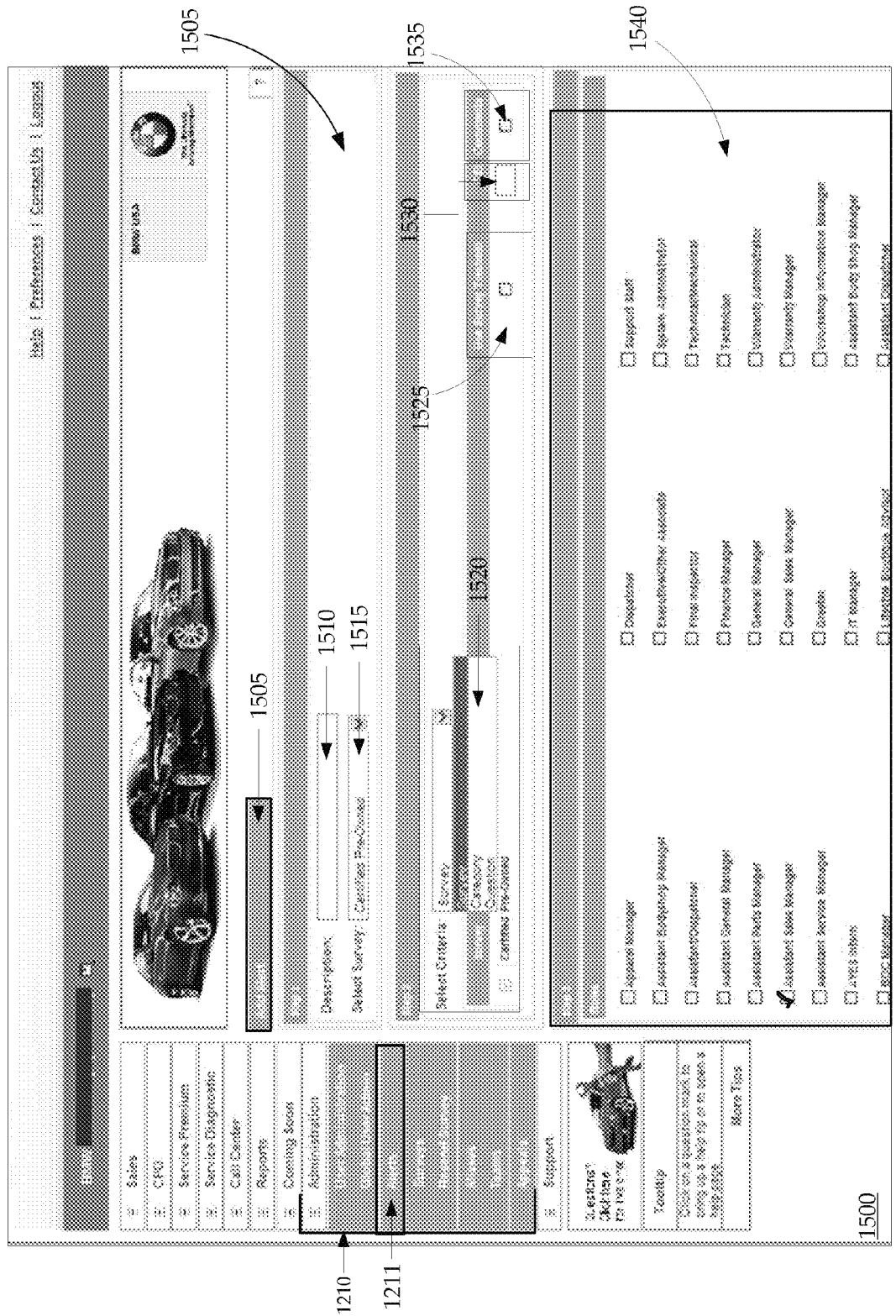
FIG. 15 illustrates an exemplary Graphical User Interface (GUI) for alert management.

FIG. 15 illustrates an exemplary Graphical User Interface (GUI) 1500 for alert management. Alerts may be generated by Alert Module 160 as discussed in the context of FIGS. 1, 2, and 3. For example, GUI 1500 may be a graphical user interface associated with Survey Management Application 122 and provided via Network 110 to, for example, to Dealer/Manufacturer Server 195 or to, for example, a client associated with Dealer/Manufacturer Server 195 (not shown in FIG. 1). GUI 1500 may be provided for display on a digital and/or display device associated with Dealer/Manufacturer Server 195 via a browser (not shown in FIG. 1). A user may log into Survey Management Application 122 and navigate GUI 1500 via user input to a digital device. Components relating to generating an alert and/or alert management may be displayed on GUI 1500. FIG. 15 illustrates Navigation Bar 1210 with tabs 1211, Add Alert View 1505, Survey Description Field 1510, Survey Type Menu 1515, Survey Criteria Menu 1520, Survey Threshold Selection 1525, CEI Threshold 1530, Comments Selection 1535 and Personnel Display 1540.

When a user logs into Survey Management Application 122, a user may navigate Tabs 1211 of Navigation Bar 1210 in order to view Alert Management GUI 1500. In some embodiments, a list of currently available alerts may be made available via Survey Management Application 122 upon log in (not shown). The list of currently available alerts may provide a selection to "Add Alert." The Add Alert View 1505 as shown in FIG. 15 may be provided upon a user input to "Add Alert." Add Alert View 1505 may provide fields, menus, and/or other information for the generation and management of alerts.

In "Step 1", a category and/or classification for the alert may be established in context. For example, a generated alert may only apply to survey responses associated with targeted surveys generated for customers of Certified Pre-Owned automobiles, as shown in Survey Type Menu 1515. Additional descriptors and/or survey identifiers may be provided to Survey Description Field 1510. Survey Description Field 1510 may be configured to receive a user input including, for example text and/or numerals.

In "Step 2", criteria for alert generation may be specified via Survey Criteria Menu 1520. For example, an alert may be generated upon receipt of a survey response, a survey response associated with a particular category (e.g. Certified Pre-Owned automobiles), and/or a survey question. In some embodiments, criteria for generating an alert may be associated with a survey threshold, a CEI threshold, or a comment via Survey Threshold Selection 1525, CEI Threshold 1530, and Comments Selection 1535 respectively.

In "Step 3", GUI 1500 personnel at the automobile dealership who may receive the alert may be specified. FIG. 15 illustrates a portion of a listing of personnel who may receive the alert in Personnel Display 1540. For example, an "Assistant Sales Manager" is selected to receive the generated alert as shown in FIG. 15. Personnel may be identified via their name, an alias, a job title, and the like. Any number of personnel may be selected to receive the generated alert. User input to "Step 1," "Step 2," and "Step 3" may be transmitted to Survey Management Application 122 upon a user input to Checkbox Icon 1264 as discussed in the context of FIG. 14 (not shown in FIG. 15).

Figure 16:
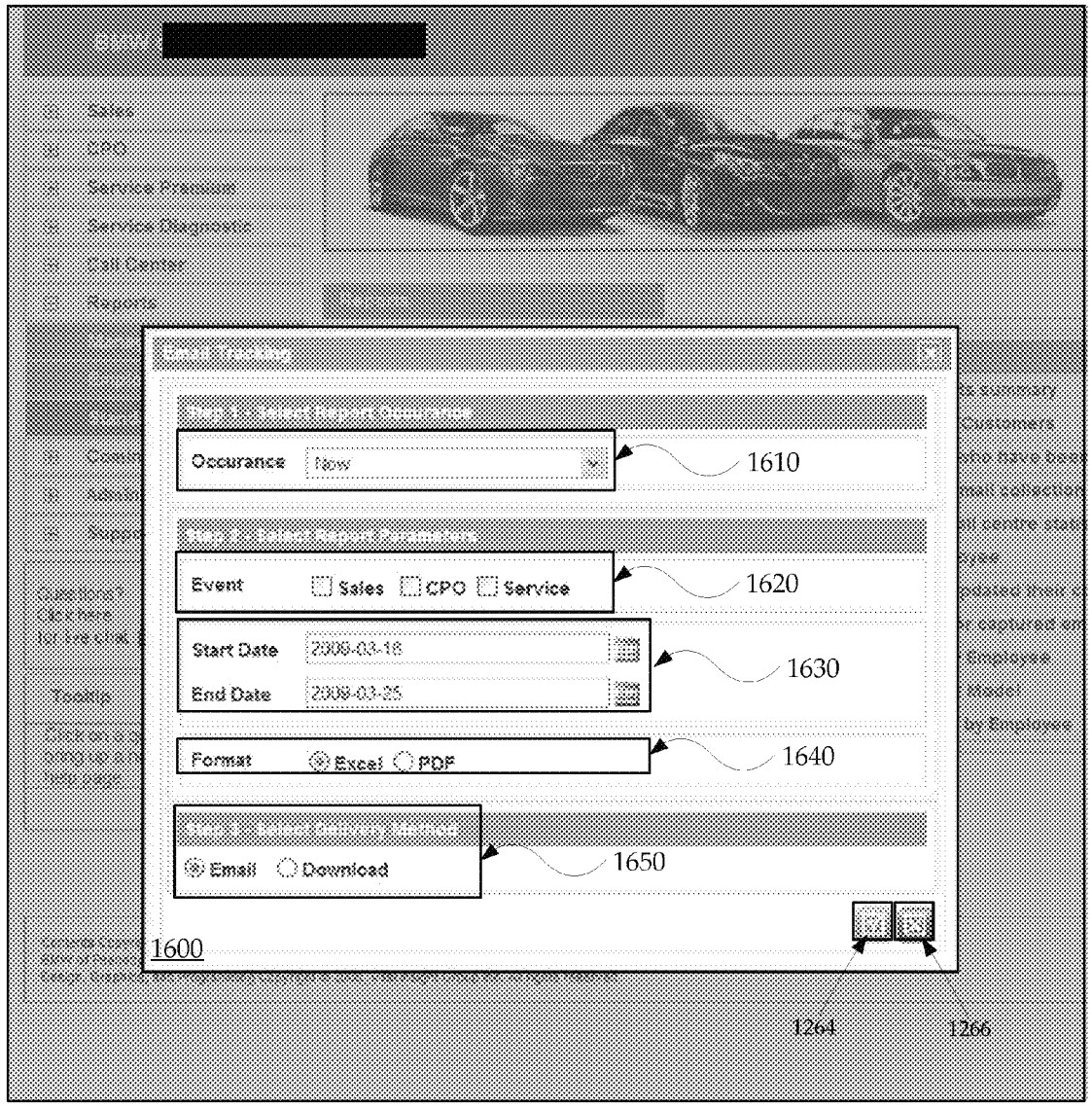
FIG. 16 illustrates an exemplary Graphical User Interface (GUI) for generating reports in accordance with embodiments of the invention.

FIG. 16 illustrates an exemplary Graphical User Interface (GUI) 1600 for generating reports in accordance with embodiments of the invention presented herein. Reports may be generated based on received survey data at any time via a report module (not shown in FIG. 1). GUI 1600 may be associated with Survey Management Application 122 and provided via Network 110 to, for example Dealer/Manufacturer Server 195 as shown in FIG. 1. GUI 1600 may be provided for display on a client associated with Dealer/Manufacturer Server 195 (not shown in FIG. 1).

Graphical User Interface (GUI) 1600 may be configured for selection of various Report Parameters 1610-1650 via user input to a digital device. FIG. 16 shows Occurrence Menu 1610, Event Selection 1620, Date Range Menu 1630, Format Selection 1640, and Delivery Method Selection 1650. Exemplary Report Parameters 1610-1650 may be made available to Survey Management Application 122 via input to GUI 1600. Although Report Parameters 1610-1650 are shown in FIG. 16, GUI 1600 may display any number of Report Parameters 1610-1650.

In "Step 1" Occurrence Menu 1610 may provide various selections for frequency of report generation. For example, a report may be generated "Now" as shown, or "Recurring" (not shown). A report may be recurring in that a report is automatically generated periodically (e.g. weekly, biweekly, monthly, quarterly, yearly, and so on). A period may be defined manually via a date range display similar to Date Range Display 540 discussed in the context of FIG. 5.

In "Step 2" Event Selection 1620 may provide a selection as to the categories of survey data to be included in the report. For example a selection of "Sales" in Event Selection 1620 will include survey data corresponding to "Sales" events. A start date and end date may be specified in Date Range Menu 1630. For example, a start date of Mar. 16, 2009 and end date of Mar. 22, 2009 as shown in FIG. 16 may provide survey data for which survey responses were received on or between the dates of Mar. 16, 2009 and Mar. 22, 2009. A format parameter for the generation of a report, such as for a PDF or Spreadsheet, such as Microsoft Excel® Spreadsheet may be provided via Format Selection 1640. A delivery method parameter may be provided via, for example, "E-mail" or "Download" as shown in FIG. 16. Reports may be transmitted via e-mail or saved locally, for example on a hard drive. Upon a user input to Checkbox Icon 1264 (discussed in context of FIG. 14), user selections made to GUI 1600 may be transmitted to Survey Management Application 122. Upon generation of the report, Survey Management Application 122 may provide the report in the formats and delivery methods selected based on inputs to Format Selection 1640 and Delivery Method Selection 1650, respectively. Reports may be stored, for example, in Survey Management Database 125 or a database associated with Dealer/Manufacturer Server 195 (not shown in FIG. 1).

The above-described functions and/or methods may include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor(s), and storage media. Exemplary storage media are in accordance with embodiments of the invention are illustrated in FIG. 1, which may include, but is not limited to any of components 105-197.

Upon reading this paper, it will become apparent to one skilled in the art that various modifications may be made to the systems, methods, and media disclosed herein without departing from the scope of the disclosure. As such, this disclosure is not to be interpreted in a limiting sense but as a basis for support of the appended claims.

The invention claimed is:

1. A method for survey management, comprising:
executing, by a processor of an application server, instructions stored in memory of the application server to perform steps of:
receiving purchase data via a computer network from a first digital device coupled to the computer network;
generating a targeted survey based on the purchase data;
transmitting a web link associated with the targeted survey to a second digital device coupled to the computer network;
receiving a survey response via the web link from the second digital device;
assigning a weight to the survey response;
transmitting the weighted survey response for display on a third digital device coupled to the computer network;
generating a score based on the survey response and the weight assigned to the survey response;
determining whether the generated score is below a threshold score;
generating a keyword based on invoice data and the survey response; and
generating an alert to the third digital device based on the keyword.

2. The method of claim 1, further comprising generating a further alert, to the third digital device based on one of the score, the survey response, a name, and any combination thereof.

3. The method of claim 1, further comprising if the generated score is below the threshold score, providing the survey response to a survey manager.

4. The method of claim 1, wherein providing the survey response for display on the third digital device coupled to the computer network is performed in real time.

5. The method of claim 1, wherein receiving information related to purchase data via the computer network from the first digital device coupled to the computer network includes:
receiving a data feed from a dealership; and
parsing the data feed to locate the purchase data.

6. The method of claim 1, further comprising:
extracting a conveyance identifier from the survey response; and
categorizing the survey response to a group of survey responses based on the conveyance identifier.

7. The method of claim 1, further comprising:
extracting an employee identifier from the survey response; and
categorizing the survey response to a group of survey responses based on the employee identifier.

8. The method of claim 1, further comprising storing the purchase data in a database coupled to the computer network.

9. The method of claim 1, wherein transmitting the survey response for display further comprises:
associating a category to the survey response; and
providing the survey response for display on the third digital device in association with the category.

10. The method of claim 1, further comprising generating a report based on the survey response and the weight assigned to the survey response.

11. The method of claim 1, wherein transmitting the survey response for display on the third digital device coupled to the computer network includes transmitting the survey response to a manufacturer of a conveyance, a dealer of a conveyance, and any combination thereof.

12. The method of claim 1, further comprising:
receiving a comment based on the survey response to the survey via the computer network from the third digital device coupled to the computer network; and
providing the comment for display on the third digital device.

13. The method of claim 1, further comprising transmitting the alert via the computer network to the third digital device based on the survey response.

14. The method of claim 1, wherein the generating of the targeted survey based on the purchase data is performed by a processor.

15. The method of claim 1, wherein the generating of the targeted survey comprises including at least one mandatory question.

16. The method of claim 1, wherein the generating of the targeted survey comprises including at least one rotating question.

17. The method of claim 1, wherein the weight assigned to the survey response is predefined.

18. The method of claim 1, wherein the weight assigned to the survey response is computed based on a defined weight upon receipt of the survey response.

19. The method of claim 1, wherein the weight assigned to the survey response is computed based on at least one numerical value associated with a plurality of survey responses in which a same survey response was received.

20. The method of claim 1, further comprising searching the survey response for the keyword.

21. The method of claim 20, further comprising grouping a set of survey responses based on an identification of the keyword.

22. The method of claim 1, further comprising assigning a keyword identifier to data in the survey response.

23. The method of claim 1, further comprising:
searching for adjectives in a keyword database; and
searching for corresponding nouns in the survey response based on identified adjectives.

24. The method of claim 1, further comprising displaying the survey data associated with the keyword.

25. A method for survey management, comprising:
executing, by a processor of an application server, instructions stored in memory of the application server to perform steps of:
receiving purchase data via a computer network from a first digital device coupled to the computer network;
generating a targeted survey based on the purchase data;
transmitting a web link associated with the targeted survey to a second digital device coupled to the computer network;
receiving a survey response via the web link from the second digital device;
assigning a weight to the survey response;
transmitting the weighted survey response for display on a third digital device coupled to the computer network;
generating a score based on the survey response and the weight assigned to the survey response;
defining a set of keywords based on at least one of a dealership identifier and a manufacturer identifier;
determining whether the generated score is below a threshold score; and
generating an alert to the third digital device based on a keyword in the survey response, wherein the keyword includes one of the set of keywords.

26. A method for survey management, comprising:
executing, by a processor of an application server, instructions stored in memory of the application server to perform steps of:
receiving purchase data via a computer network from a first digital device coupled to the computer network;
generating a targeted survey based on the purchase data;
transmitting a web link associated with the targeted survey to a second digital device coupled to the computer network;
receiving a survey response via the web link from the second digital device;
assigning a weight to the survey response;
transmitting the weighted survey response for display on a third digital device coupled to the computer network;
generating a score based on the survey response and the weight assigned to the survey response;
searching the survey response for nouns in a keyword database;
searching for corresponding adjectives in the survey response based on identified nouns;
determining whether the generated score is below a threshold score; and
generating an alert to the third digital device based on the nouns and adjectives in the survey response.

* * * * *